(12) United States Patent
Kawakami et al.

(10) Patent No.: US 8,859,702 B2
(45) Date of Patent: Oct. 14, 2014

(54) POLYMER COMPOSITION FOR CEMENT DISPERSANT AND METHOD FOR PRODUCING SAME

(75) Inventors: Hirokatsu Kawakami, Suita (JP); Naohiko Itayama, Suita (JP)

(73) Assignee: Nippon Shokubai Co., Ltd., Osaka (JP)

( * ) Notice: Subject to any disclaimer, the term of this patent is extended or adjusted under 35 U.S.C. 154(b) by 106 days.

(21) Appl. No.: 13/390,019

(22) PCT Filed: Aug. 10, 2010

(86) PCT No.: PCT/JP2010/063548
§ 371 (c)(1),
(2), (4) Date: Feb. 10, 2012

(87) PCT Pub. No.: WO2011/019034
PCT Pub. Date: Feb. 17, 2011

(65) Prior Publication Data
US 2012/0142876 A1    Jun. 7, 2012

(30) Foreign Application Priority Data
Aug. 12, 2009   (JP) .................................. 2009-187087

(51) Int. Cl.
| | | |
|---|---|---|
| *C08F 220/06* | (2006.01) | |
| *C07C 41/01* | (2006.01) | |
| *C07C 43/15* | (2006.01) | |
| *C04B 24/26* | (2006.01) | |
| *C08F 290/06* | (2006.01) | |
| *C04B 103/40* | (2006.01) | |

(52) U.S. Cl.
CPC ......... *C04B 24/2647* (2013.01); *C08F 290/062* (2013.01); *C04B 24/267* (2013.01); *C04B 2103/408* (2013.01)
USPC ............................ 526/320; 526/240; 568/616

(58) Field of Classification Search
CPC ... C08F 220/06; C08F 290/062; C07C 41/01; C07C 43/15; C04B 24/2647; C04B 24/267; C04B 2103/408

USPC .................................. 526/320, 240; 568/616
See application file for complete search history.

(56) References Cited

U.S. PATENT DOCUMENTS

| | | | |
|---|---|---|---|
| 6,174,980 B1 * | 1/2001 | Hirata et al. .................. | 526/320 |
| 6,388,038 B1 | 5/2002 | Hirata et al. | |
| 2003/0125492 A1 | 7/2003 | Yamamoto et al. | |

FOREIGN PATENT DOCUMENTS

| | | | |
|---|---|---|---|
| CN | 1189473 A | | 8/1998 |
| CN | 101189197 A | | 5/2008 |
| JP | 4068323 A | | 11/1992 |
| JP | 2003-012358 A | | 1/2003 |
| JP | 2003012358 A | * | 1/2003 |
| JP | P3683176 B2 | | 8/2005 |
| JP | 2008-106238 A | | 5/2006 |
| JP | 2008-542159 A | | 11/2008 |
| JP | 2009-155457 A | | 7/2009 |
| WO | WO-2006/129883 A1 | | 12/2006 |
| WO | WO 2006129883 A1 | * | 12/2006 |

* cited by examiner

*Primary Examiner* — Michael M Bernshteyn
(74) *Attorney, Agent, or Firm* — Novak Druce Connolly Bove + Quigg LLP

(57) ABSTRACT

The present invention has an object to provide a polymer-containing composition for dispersants for cement which exhibits higher cement dispersibility even when used in a small amount, and can provide high flowability to a cement composition such as mortar and concrete and stably maintain this high flowability for a certain period, and to provide a production method thereof. The polymer-containing composition for dispersants for cement includes a polymer including a repeating unit derived from an unsaturated polyalkylene glycol ether monomer (I) having a specific structure and a repeating unit derived from an unsaturated carboxylic acid monomer (II) having a specific structure, and is prepared by polymerizing an unsaturated polyalkylene glycol ether monomer (I)-containing composition that includes specific amounts of specific components.

16 Claims, 3 Drawing Sheets

POLYMER COMPOSITION FOR CEMENT DISPERSANT AND METHOD FOR PRODUCING SAME

CROSS-REFERENCE TO RELATED APPLICATIONS

This Application is a 35 U.S.C. 371 Application of International Application No. PCT/JP2010/063548, filed Aug. 10, 2010, claiming priority from Japanese Patent Application No. 2009-187087, filed Aug. 12, 2009, the entire contents of which are herein incorporated by reference.

TECHNICAL FIELD

The present invention relates to a polymer-containing composition for dispersants for cement, a production method thereof, and a monomer-containing composition as a material for the polymer-containing composition.

BACKGROUND ART

In recent years, the concrete industry has strongly demanded improved durability and strength of concrete structures, and this has created a great need to reduce the unit amount of water. Notably, many polycarboxylic acid-based dispersants for cement have been proposed because these dispersants exhibit higher water-reducing ability than other conventional dispersants for cement such as naphthalene-based dispersants.

One example of such conventional polycarboxylic acid-based dispersants for cement is a copolymer prepared from a specific ratio of an unsaturated carboxylic acid monomer and an unsaturated alcoholic monomer (for example, Patent Document 1). A copolymer obtained by polymerizing an unsaturated polyalkylene glycol ether monomer having a chain of a specific length and an unsaturated monocarboxylic acid monomer has also been proposed as a copolymer for admixtures for cement which exhibits high dispersibility even when used in a small amount (for example, Patent Document 2). Another proposal is for a method for producing a copolymer of an unsaturated polyalkylene glycol ether monomer and an unsaturated monocarboxylic acid-based monomer which provides a copolymer that can improve the quality of cement compositions such as mortar and concrete when used as an admixture for cement (for example, Patent Document 3).

Patent Document 1: JP 04-68323 B (p. 1-2)
Patent Document 2: Japanese Patent No. 3683176 (p. 1-2)
Patent Document 3: JP 2008-106238 A (p. 1-4)

SUMMARY OF THE INVENTION

Problems to be Solved by the Invention

As mentioned above, in order to achieve high cement dispersibility, various examinations have been performed on copolymers used for dispersants for cement. Currently, a growing demand of this industry is for dispersants for cement which exhibit higher cement dispersibility even when used in a smaller amount. Specifically, a growing demand for improved quality of concrete structures and improved handleability and efficiency in work sites has created another demand for long-lasting high dispersibility in work sites. In order to sufficiently meet these demands, the evaluation standard for dispersants for cements has become more severe than before. However, conventional polycarboxylic acid dispersants for cement such as those described above do not have cement dispersibility high enough to completely meet these demands of the industry. Accordingly, there exists a need for dispersants forcement which exhibit much higher cement dispersibility beyond the limit of the conventional techniques.

The present invention was made in view of the background described above and aims to provide a polymer-containing composition for dispersants for cement which exhibits higher cement dispersibility even when used in a small amount, and can provide high flowability to a cement composition such as mortar and concrete and stably maintain this high flowability for a certain period, and to provide a method for producing the composition.

Means for Solving the Problems

The present inventors have examined various polymer-containing compositions suited for dispersants for cement and focused on a composition containing a polymer including a repeating unit derived from an unsaturated polyalkylene glycol ether monomer having a specific structure and a repeating unit derived from an unsaturated carboxylic acid monomer having a specific structure. Consequently, the present inventors have found that a polymer-containing composition with excellent cement dispersibility can be prepared by polymerizing, as a polymerization material for the polymer-containing composition, a monomer-containing composition containing an unsaturated polyalkylene glycol ether monomer which also contains specific amounts of a polyalkylene glycol and an isomer of the unsaturated polyalkylene glycol ether monomer in which the double bond is transferred; and that such a polymer-containing composition obtained by polymerizing such a monomer-containing composition is suitably used as a dispersant for cement which exhibits high cement dispersibility even when used in a small amount, and can provide high flowability to a cement composition such as mortar and concrete and stably maintain this high flowability even after a certain period. Thus, the above problems have been admirably solved, leading to completion of the present invention.

The present invention provides a polymer-containing composition for dispersants for cement which includes a polymer including a repeating unit derived from an unsaturated polyalkylene glycol ether monomer (I) and a repeating unit derived from an unsaturated carboxylic acid monomer (II). The unsaturated polyalkylene glycol ether monomer (I) is represented by the following formula (1).

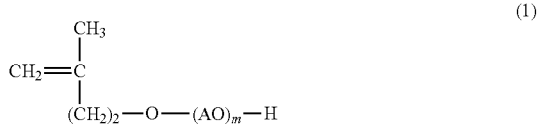

In the formula, AO is a C2-C18 oxyalkylene group; and m is an average addition number of moles of the oxyalkylene groups and is 25 to 250.

The unsaturated carboxylic acid monomer (II) is represented by the following formula (2).

In the formula, $R^3$ and $R^4$, which are the same or different, each are a hydrogen atom, a methyl group, or —COOM$^2$ and are not both —COOM$^2$; $R^5$ is a hydrogen atom, a methyl group, or —CH$_2$COOM$^3$; $R^3$ and $R^4$, which are the same or different, each are a hydrogen atom or a methyl group when $R^5$ is —CH$_2$COOM$^3$; $M^1$, $M^2$, and $M^3$ each are a hydrogen atom, a monovalent metal, a divalent metal, ammonium, or an organic amine.

The polymer-containing composition is prepared by polymerizing an unsaturated polyalkylene glycol ether monomer (I)-containing composition that includes 1 to 5% by mass of a polyalkylene glycol (A) and 1 to 5% by mass of an isomer (B) of the unsaturated polyalkylene glycol ether monomer (I) in which the double bond is transferred, based on 100% by mass of the unsaturated polyalkylene glycol ether monomer (I).

The following discussion provides a detailed description of the present invention.

The polymer-containing composition for dispersants for cement of the present invention is a composition that contains a copolymer having a repeating unit derived from an unsaturated polyalkylene glycol ether monomer (I) and a repeating unit derived from an unsaturated carboxylic acid monomer (II), a polyalkylene glycol (A), and an isomer (B).

The copolymer in the polymer-containing composition of the present invention may include repeating unit(s) derived from other copolymerizable monomer(s) in addition to the repeating unit derived from the unsaturated polyalkylene glycol ether monomer (I) and the repeating unit derived from the unsaturated carboxylic acid monomer (II), and may include a repeating unit derived from the isomer (B) of the unsaturated polyalkylene glycol ether monomer (I) in which the double bond is transferred.

The polymer-containing composition for dispersants for cement of the present invention further includes a polyalkylene glycol (A) and an isomer (B) of the unsaturated polyalkylene glycol ether monomer (I) in which the double bond is transferred, in addition to the copolymer. The polyalkylene glycol (A) is mostly derived from the polyalkylene glycol (A) in the unsaturated polyalkylene glycol ether monomer (I)-containing composition used as a polymerization material. The isomer (B) of the unsaturated polyalkylene glycol ether monomer (I) in which the double bond is transferred is derived from the isomer (B) in the unsaturated polyalkylene glycol ether monomer (I)-containing composition used as a polymerization material. Since the isomer (B) is a polymerizable compound, the amount thereof is found to be reduced to approximately ¾ of the original amount in the unsaturated polyalkylene glycol ether monomer (I)-containing composition used as a polymerization material.

The polymer-containing composition for dispersants for cement of the present invention is prepared by polymerizing the unsaturated polyalkylene glycol ether monomer (I)-containing composition that includes 1 to 5% by mass of the polyalkylene glycol (A) and 1 to 5% by mass of the isomer (B) of the unsaturated polyalkylene glycol ether monomer (I) in which the double bond is transferred, based on 100% by mass of the unsaturated polyalkylene glycol ether monomer (I). It goes without saying that the unsaturated polyalkylene glycol ether monomer (I)-containing composition further includes the unsaturated carboxylic acid monomer (II) which will be incorporated as the other monomer unit in the copolymer in the polymer-containing composition for dispersants for cement of the present invention, and that the monomer-containing composition may optionally further include other copolymerizable monomer(s).

In the unsaturated polyalkylene glycol ether monomer (I)-containing composition, the amount of the polyalkylene glycol (A) is 1 to 5% by mass, and is more preferably 2 to 5% by mass, and furthermore preferably 3 to 5% by mass, based on 100% by mass of the unsaturated polyalkylene glycol ether monomer (I). If the amount is as small as less than 1% by mass, the amount of the polyalkylene glycol (A) in the resulting polymer-containing composition is less likely to be stably controlled. In addition, such a small amount of less than 1% by mass will not produce a sufficient cement dispersion improving effect relative to the cost. On the other hand, if the amount of the polyalkylene glycol (A) is as much as more than 5% by mass, the polymer-containing composition produced as a result of the polymerization has low cement dispersibility.

In the unsaturated polyalkylene glycol ether monomer (I)-containing composition, the amount of the isomer (B) is 1 to 5% by mass, and is more preferably 1 to 4% by mass, and furthermore preferably 1 to 3.5% by mass, based on 100% by mass of the unsaturated polyalkylene glycol ether monomer (I). If the amount is as small as less than 1% by mass, the amount of the isomer (B) in the resulting polymer-containing composition is less likely to be stably controlled. In addition, such a small amount of less than 1% by mass will not produce a sufficient cement dispersion improving effect relative to the cost, and fails to provide the ability to stably maintain good quality of a cement composition for a certain period. The isomer (B) is presumed to improve the cement dispersibility of the copolymer itself since the isomer (B) is, as described above, a polymerizable compound, and therefore is incorporated as a repeating unit in the copolymer produced as a result of the polymerization. On the other hand, if the amount of the isomer (B) is as much as more than 5% by mass, the polymer-containing composition produced as a result of the polymerization has low cement dispersibility.

The polymer-containing composition for dispersants for cement of the present invention is obtained by polymerizing an unsaturated polyalkylene glycol ether monomer (I)-containing composition that satisfies the following inequalities.

$$3 \leq \alpha + 0.75 \times \beta \leq 8 \quad (3)$$

and $$1 \leq \beta \leq 4 \quad (4)$$

In the inequalities, $\alpha$ is an amount of the polyalkylene glycol (A) and $\beta$ is an amount of the isomer (B) based on 100% by mass of the unsaturated polyalkylene glycol ether monomer (I).

The above inequality (4) for regulating the amount $\beta$ of the isomer (B) is provided to define a preferable range in terms of the ability to maintain the cement dispersibility based on the above-mentioned fact that the isomer (B), which is a polymerizable compound, is incorporated as a repeating unit in the copolymer produced as a result of the polymerization and therefore produces the above-mentioned effect. Specifically, if $\beta$ is less than 1, the ability to stably maintain good quality of a cement composition cannot be achieved; if $\beta$ is as large as more than 4, the polymer composition produced as a result of the polymerization has low cement dispersibility. The amount $\beta$ of the isomer (B) is preferably 1 to 3.5.

The above inequality (3) for regulating the parameter calculated from the amount $\alpha$ of the polyalkylene glycol (A) and the amount $\beta$ of the isomer (B) is constructed based on the above-mentioned fact that the polymerizability of the polymerizable isomer (B) is so low that approximately ¾ of the original amount of the isomer (B) in the unsaturated polyalkylene glycol ether monomer (I)-containing composition used as a polymerization material remain unreacted but the unreacted isomer (B) as well as the polyalkylene glycol (A) tends not to contribute to the cement dispersibility of the polymer-containing composition for dispersants for cement produced as a result of the polymerization. Specifically, the inequality (3) means that the total of the amount of the unreacted isomer (B) represented by 0.75×β and the amount α of the polyalkylene glycol (A) is preferably 3 to 8. If the parameter of the inequality (3) is set to less than 3, it is difficult to stably achieve such a parameter value and to achieve a sufficient cement dispersibility improving effect relative to the cost required to achieve this parameter value. On the other hand, if the parameter of the inequality (3) is more than 8, the polymer-containing composition for dispersants for cement produced as a result of the polymerization may have low cement dispersibility.

The lower limit of the parameter of the inequality (3) is preferably 4 and the upper limit thereof is preferably 7.

The polyalkylene glycol (A) in the unsaturated polyalkylene glycol ether monomer (I)-containing composition used as a polymerization material is not particularly limited and examples thereof include polyalkylene glycols such as polyethylene glycol and polypropylene glycol. The degree of polymerization of such polyalkylene glycols is typically 2 to 250.

The isomer (B) in the unsaturated polyalkylene glycol ether monomer (I)-containing composition used as a polymerization material is not particularly limited, provided that it is an isomer of the unsaturated polyalkylene glycol ether monomer (I) in which the double bond is transferred. Examples thereof include compounds represented by the following formula (5).

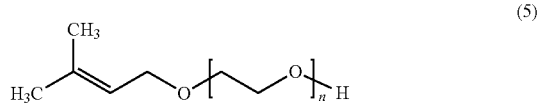

(5)

In the formula, n is 25 to 250.

Examples of the unsaturated polyalkylene glycol ether monomer (I) used to produce the copolymer in the polymer-containing composition for dispersants for cement of the present invention include 25 to 250 mol alkylene oxide adducts of C5 unsaturated alcohols such as 3-methyl-3-butene-1-ol. Any of these compounds may be used alone, or two or more of these may be used in combination. Among these compounds, particularly preferred are 25 to 250 mol alkylene oxide adducts of 3-methyl-3-butene-1-ol (isoprenol).

Examples of the alkylene oxide include ethylene oxide, propylene oxide, and butylene oxide. Two or more alkylene oxides may be used. In this case, any of random addition, block addition, and alternating addition may be used.

The average addition number of moles of the oxyalkylene groups in the unsaturated alcohol-alkylene oxide adduct is 25 to 250, as described above. If the average addition number of moles is less than 25, the resulting copolymer has low cement dispersibility and low ability to maintain the dispersibility. On the other hand, if the average addition number of moles is more than 250, the polymerizability of this compound is low. In addition, the synthesis of this compound by an addition reaction of the alkylene oxide is difficult. Accordingly, the average addition number of moles of the oxyalkylene groups is preferably 30 to 200, more preferably 40 to 100, and further more preferably 50 to 75.

The number of carbon atoms in each oxyalkylene group is 2 to 18, and is preferably 2 to 8, and more preferably 2 to 4. In the case that the unsaturated polyalkylene glycol ether monomer (I) is a single monomer, it is preferable that the oxyalkylene groups essentially include oxyethylene groups, in order to achieve a balance of hydrophilicity and hydrophobicity. More preferably, the oxyethylene groups constitute not less than 50 mol % of the oxyalkylene groups. In the case that the unsaturated polyalkylene glycol ether monomer (I) includes two or more monomers, it is preferable that the oxyalkylene groups of any one of these monomers essentially include oxyethylene groups.

Specific examples of the unsaturated polyalkylene glycol ether monomer (I) include polyethylene glycol mono(3-methyl-3-butenyl)ether and polyethylene polypropylene glycol mono(3-methyl-3-butenyl)ether.

Examples of the unsaturated carboxylic acid monomer (II) used to produce the copolymer in the polymer-containing composition for dispersants for cement of the present invention include unsaturated monocarboxylic acid such as acrylic acid, methacrylic acid, and crotonic acid; unsaturated dicarboxylic acid such as maleic acid, maleic anhydride, fumaric acid, itaconic acid, and citraconic acid; and monovalent metal salts, divalent metal salts, ammonium salts, and organic amine salts thereof. Any of these may be used alone, or two or more of these may be used in combination. In terms of polymerizability, acrylic acid, maleic acid, and monovalent salts thereof are preferred among the above examples of the unsaturated carboxylic acid monomer (II).

Examples of other copolymerizable monomers optionally used to produce the copolymer in the polymer-containing composition for dispersants for cement of the present invention include half esters and diesters of C1-C30 alcohols and the unsaturated dicarboxylic acid monomers listed above as examples of the unsaturated carboxylic acid monomer (II); half amides and diamides of the unsaturated dicarboxylic acid monomers and C1-C30 amines; half esters and diesters of alkyl(poly)alkylene glycols and the unsaturated dicarboxylic acids; half esters and diesters of the unsaturated dicarboxylic acids and C2-C18 glycols or polyalkylene glycols of these glycols (addition number of moles of glycol: 2 to 500); esters of C1-C30 alcohols and unsaturated monocarboxylic acids such as methyl(meth)acrylate, ethyl(meth)acrylate, propyl(meth)acrylate, glycidyl(meth)acrylate, methyl crotonate, ethyl crotonate, and propyl crotonate; esters of unsaturated monocarboxylic acids such as (meth)acrylic acid and alkoxy (poly)alkylene glycols obtained by adding 1 to 500 mol of C2-C18 alkylene oxides to C1-C30 alcohols; hydroxyl group-containing (meth)acrylates such as hydroxyethyl (meth)acrylate and hydroxypropyl(meth)acrylate; and 1 to 500 mol C2-C18 alkylene oxide adducts of unsaturated monocarboxylic acids such as (poly)ethylene glycol monomethacrylate, (poly)propylene glycol monomethacrylate, and (poly)butylene glycol monomethacrylate. Any of these copolymerizable monomers may be used alone, or two or more of these may be used in combination. Among these, preferred are esters of C1-C30 alcohols and unsaturated monocarboxylic acids such as methyl(meth)acrylate, and hydroxyl group-containing (meth)acrylates such as hydroxyethyl(meth)acrylate.

The polymerization reaction to produce the polymer-containing composition for dispersants for cement of the present invention can be carried out by conventionally known methods such as solution polymerization and bulk polymerization. In the case of solution polymerization, the polymerization may be batch or continuous. Examples of usable solvents include water; lower alcohols such as methyl alcohol, ethyl alcohol, and isopropyl alcohol; aromatic or aliphatic hydrocarbons such as benzene, toluene, xylene, n-hexane, and cyclohexane; esters such as ethyl acetate; ketones such as acetone and methyl ethyl ketone; and cyclic ethers such as tetrahydrofuran and 1,4-dioxane. Any of these solvents may be used alone, or two or more of these may be used in combination. Preferably, at least one selected from the group consisting of water and lower C1-C4 alcohols is used among these solvents in view of the solubility of the material monomers and the resulting copolymer. In particular, water is preferably used as the solvent because it does not require any solvent removal process.

The use of chain transfer agent(s) in the polymerization reaction facilitates control of the molecular weight of the resulting copolymer, resulting in efficient production of the copolymer that exhibits excellent performance as a dispersant for cement. In particular, in the case that the total amount of all the monomers is as much as not less than 30% by mass of all the materials used in the polymerization, the use of chain transfer(s) agent is effective.

Such chain transfer agents are not particularly limited and specific examples thereof include thiol compounds such as mercapto ethanol, thioglycerol, thioglycolic acid, 2-mercaptopropionic acid, and 3-mercaptopropionic acid; halides such as carbon tetrachloride, methylene chloride, bromoform, and bromotrichloroethane; secondary alcohols such as isopropanol; lower oxides and salts thereof such as phosphorous acid, hypophosphorous acid, and salts thereof (e.g. sodium hypophosphite, potassium hypophosphite), and sulfurous acid, hydrogen sulfite, dithionous acid, metabisulfite, and salts thereof (e.g. sodium sulfite, potassium sulfite, sodium hydrogen sulfite, potassium hydrogen sulfite, sodium dithionite, potassium dithionite, sodium metabisulfite, potassium metabisulfite).

If the polymerization reaction is carried out at a pH of lower than 5, the copolymerizability is enhanced, the production cost of the copolymer product can be reduced, and the resulting polycarboxylic acid copolymer can provide a dispersant for cement which exhibits higher performance than conventional ones. Preferably, the pH is controlled to 2 to 3 during the polymerization by using a pH adjuster.

Examples of the pH adjuster include phosphoric acid and/or salts thereof, organic sulfonic acids and/or salts thereof, hydrochloric acid and/or salts thereof, nitric acid and/or salts thereof, and sulfuric acid and/or salts thereof. Particularly, at least one selected from the group consisting of phosphoric acid and/or salts thereof, and organic sulfonic acids and/or salts thereof is preferably used. Organic sulfonic acids and/or salts thereof are more preferable because the required amount is small.

Any appropriate salt can be used among the above-mentioned salts and examples thereof include alkali metal salts, alkaline earth metal salts, ammonium salts, and organic ammonium salts. Any of the pH adjusters can be used alone, or two or more pH adjusters may be used in combination.

Specific examples of the organic sulfonic acids and/or salts thereof include paratoluenesulfonic acid and/or hydrates thereof, and methanesulfonic acid and/or salts thereof.

In terms of the handleability of the copolymer produced as a result of the polymerization reaction, the pH is preferably controlled within the range of 5 to 7 with a neutralizer after the polymerization.

Examples of the neutralizer include alkaline substances such as inorganic salts (e.g. hydroxides and carbonates of monovalent metals and divalent metals), ammonia, and organic amines.

Examples of polymerization initiators include common radical polymerization initiators. Examples of polymerization initiators used in the case of aqueous solution polymerization include peroxides such as persulfates (e.g. ammonium persulfate, sodium persulfate, potassium persulfate) and hydrogen peroxide; and azo initiators such as azo amidine compounds (e.g. 2,2'-azobis-2-methylpropionamidine hydrochloride), cyclic azoamidine compounds (e.g. 2,2'-azobis-2-(2-imidazolin-2-yl)propane hydrochloride), and 2-carbamoyl azobisisobutyronitrile. Examples of radical polymerization initiators used in the case of solution polymerization using a lower alcohol, aromatic or aliphatic hydrocarbon, ester, ketone, or the like as a solvent or in the case of bulk polymerization include peroxides such as benzoyl peroxide, lauroyl peroxide, sodium peroxide, t-butyl hydroperoxide, and rumen hydroperoxide; and azo initiators such as azobisisobutyronitrile. In the case that a water-lower alcohol solvent mixture is used, appropriate initiator(s) selected from the radical polymerization initiators listed above can be used.

The polymerization reaction is preferably initiated by a redox type polymerization initiator such as a combination of such a peroxide as those listed above and a reductant. Examples of such reductants include, but are not particularly limited to, salts of low valence metals (e.g. Fe(II), Sn(II), Ti(III), Cr(II), V(II), Cu(II)), such as Mohr's salt; amine compounds and salts thereof such as monoethanol amine, diethanol amine, triethanol amine, hydroxyl amine, hydroxylamine hydrochloride, and hydrazine; sodium dithionite, formaldehyde sodium sulfoxylate, sodium hydroxymethanesulfinate dihydrate; organic compounds having groups such as —SH, —SO$_2$H, —NHNH$_2$, and —COCH(OH)—, and salts thereof; alkaline metal sulfites (e.g. sodium sulfite, sodium bisulfite, metabisulfites), and lower oxides and salts thereof (e.g. hypophosphorous acid, sodium hypophosphite, sodium hydrosulfite, sodium hyponitrite); invert sugar such as D-fructose and D-glucose; thiourea compounds such as thiourea and thiourea dioxide; and L-ascorbic acid (salts), L-ascorbic acid esters, erythorbic acid (salts), and erythorbic acid esters.

The amount of the peroxide is preferably not less than 0.01 mol %, more preferably not less than 0.1 mol %, and further more preferably not less than 1 mol %, and is preferably not more than 30 mol %, more preferably not more than 20 mol %, and further more preferably not more than 5 mol %, based on the total amount of all the monomer components. If the amount of the peroxide is less than 0.01 mol %, more monomers may remain unreacted. On the other hand, if the amount of the peroxide is more than 30 mol %, the resulting polycarboxylic acid includes many oligomeric parts.

The amount of the reductant is preferably not less than 0.1 mol %, more preferably not less than 1 mol %, further more preferably not less than 10 mol %, and particularly preferably not less than 50 mol %, and is preferably not more than 500 mol %, more preferably not more than 300 mol %, further more preferably not more than 200 mol %, and particularly preferably not more than 100 mol %, based on the amount of the peroxide. If the amount of the reductant is less than 0.1 mol %, a sufficient amount of active radicals is not generated, which may result in a large residual amount of unreacted monomers. On the other hand, if the amount of the reductant is more than 500 mol %, a larger portion of the reductant may not react with hydrogen peroxide and may remain unreacted.

In order to achieve high reactivity of the monomers in the polymerization reaction, the temperature is preferably controlled such that the half-life of the radical polymerization initiator(s) is 0.5 to 500 hours. The half-life is more preferably 1 to 300 hours, and further more preferably 3 to 150 hours. For example, in the case that a persulfate is used as the initiator, the temperature of the polymerization reaction is suitably 40° C. to 100° C., and is preferably 45° C. to 90° C., and more preferably 50° C. to 80° C. In the case that a combination of hydrogen peroxide and L-ascorbic acid (salt) is used as the initiator, the temperature of the polymerization reaction is suitably 30° C. to 100° C., and is preferably 40° C. to 95° C., and more preferably 45° C. to 85° C. In the case of bulk polymerization, the temperature is preferably 50° C. to 200° C.

The polymerization reaction time is suitably 0.5 to 10 hours, and is preferably 0.5 to 8 hours, and more preferably 1 to 6 hours. If the polymerization reaction time is outside these ranges, the degree of polymerization and productivity are disadvantageously low.

The polymerization reaction is preferably carried out in an inert gas atmosphere. Examples of the inert gas include nitrogen and argon. The inert gas atmosphere in the polymerization reaction system can be formed by common methods for forming an inert gas atmosphere in a reaction system and examples thereof include a method of blowing an inert gas into the reaction system.

For the production of the polymer-containing composition for dispersions for cement of the present invention, the amount of the unsaturated polyalkylene glycol ether monomer (I)-containing composition used as a polymerization material is suitably 20 to 95% by mass, and is preferably 30 to 93% by mass, and more preferably 40 to 90% by mass, based on the total amount of all the materials including polymerization aids such as the chain transfer agent(s) and the polymerization initiator(s), and the solvent(s). If the amount of the unsaturated polyalkylene glycol ether monomer (I)-containing composition is outside the above ranges, the degree of polymerization and cement dispersibility are disadvantageously low.

As described above, the unsaturated polyalkylene glycol ether monomer (I)-containing composition used as a polymerization material in the present invention contains 1 to 5% by mass of the polyalkylene glycol (A) and 1 to 5% by mass of the isomer (B), based on 100% by mass of the unsaturated polyalkylene glycol ether monomer (I), and further contains the unsaturated carboxylic acid monomer (II) as a copolymerizable component.

The ratio of the unsaturated polyalkylene glycol ether monomer (I) and the unsaturated carboxylic acid monomer (II) in the unsaturated polyalkylene glycol ether monomer (I)-containing composition is not particularly limited, and the ratio of the monomer (I)/the monomer (II) is suitably (1 to 99) (1 to 99) (% by mass), and is preferably (50 to 99)/(1 to 50), and more preferably (60 to 97)/(3 to 40). In the case that the unsaturated polyalkylene glycol ether monomer (I)-containing composition contains other monomer(s) as optional copolymerizable component(s), the proportional amount of the other monomer(s) is suitably not more than 50% by mass, and is preferably not more than 30% by mass, and more preferably not more than 15% by mass, based on the total amount of the monomers (I) and (II).

The weight average molecular weight of the copolymer in the polymer-containing composition for dispersants for cement of the present invention is preferably not less than 10,000, and more preferably not less than 20,000, and is preferably not more than 200,000, and more preferably not more than 70,000, as determined by gel permeation chromatography (hereinafter, also referred to as "GPC") based on polyethylene glycol. The cement dispersibility of the polymer-containing composition for dispersants for cement of the present invention can be enhanced by appropriately controlling the weight ratio of the monomers and the weight average molecular weight within the above ranges, thereby optimizing the present invention.

The present invention also provides a method for producing a polymer-containing composition for dispersants for cement, which includes an addition reaction of an alkylene oxide to an unsaturated polyalkylene glycol ether (III). The unsaturated polyalkylene glycol ether (III) is represented by the following formula (3).

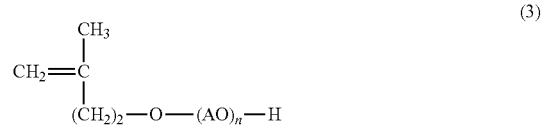

In the formula, AO is a C2-C18 oxyalkylene group; and n is an average addition number of moles of the oxyalkylene groups and is 2 to 15.

The addition reaction is carried out at a temperature of not lower than 80° C. and lower than 100° C., and an alkali catalyst is used in the addition reaction in an amount of 500 to 3,000 ppm based on the total amount of the unsaturated polyalkylene glycol ether (III) and the alkylene oxide.

As described above, the composition containing the unsaturated polyalkylene glycol ether monomer (I) used as a polymerization material for the polymer-containing composition for dispersants for cement of the present invention and the method for producing this composition are also one aspect of the present invention. Namely, the present invention provides a composition containing an unsaturated polyalkylene glycol ether monomer (I) represented by the following formula (1).

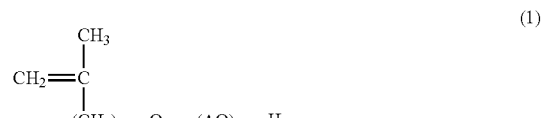

In the formula, AO is a C2-C18 oxyalkylene group; and m is an average addition number of moles of the oxyalkylene groups and is 25 to 250.

The monomer (I)-containing composition further includes 1 to 5% by mass of a polyalkylene glycol (A) and 1 to 5% by mass of an isomer (B) of the unsaturated polyalkylene glycol ether monomer (I) in which the double bond is transferred, based on 100% by mass of the unsaturated polyalkylene glycol ether monomer (I). The present invention also provides a method for producing an unsaturated polyalkylene glycol ether monomer (I)-containing composition, which includes an addition reaction of an alkylene oxide to an unsaturated polyalkylene glycol ether. The unsaturated polyalkylene glycol ether (III) is represented by the following formula (3).

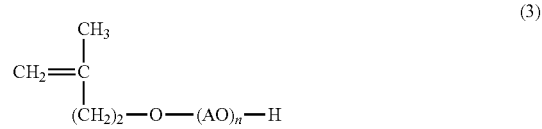

In the formula, AO is a C2-C18 oxyalkylene group; and n is an average addition number of moles of the oxyalkylene groups and is 2 to 15.

The addition reaction is carried out at a temperature of not lower than 80° C. and lower than 100° C., and an alkali catalyst is used in the addition reaction in an amount of 500 to 3,000 ppm based on the total amount of the unsaturated polyalkylene glycol ether (III) and the alkylene oxide.

The following discussion provides a detailed description of the unsaturated polyalkylene glycol ether monomer (I)-containing composition of the present invention and the method for producing the composition, and the method for producing a polymer-containing composition for dispersants for cement of the present invention.

The unsaturated polyalkylene glycol ether monomer (I)-containing composition of the present invention is a composition containing the unsaturated polyalkylene glycol ether monomer (I) used as a polymerization material for the polymer-containing composition for dispersants for cement of the present invention, and is an intermediate material for the production of the polymer-containing composition for dispersants for cement of the present invention. Therefore, the unsaturated polyalkylene glycol ether monomer (I)-containing composition of the present invention has already described above. Specifically, the unsaturated polyalkylene glycol ether monomer (I)-containing composition of the present invention preferably satisfies the following inequalities.

$$3 \leq \alpha + 0.75 \times \beta \leq 8 \tag{3}$$

$$1 \leq \beta \leq 4 \tag{4}$$

In the inequalities, α is an amount of the polyalkylene glycol (A) and β is an amount of the isomer (B) based on 100% by mass of the unsaturated polyalkylene glycol ether monomer (I).

In the method for producing a polymer-containing composition for dispersants for cement of the present invention, all the features of the method for producing an unsaturated polyalkylene glycol ether monomer (I)-containing composition of the present invention can be used in the polymerization to produce the unsaturated polyalkylene glycol ether monomer (I)-containing composition. Accordingly, the following illustrates the method for producing an unsaturated polyalkylene glycol ether monomer (I)-containing composition and the method for producing a polymer-containing composition for dispersants for cement of the present invention together.

In the production methods of the present invention, an alkylene oxide is added to an unsaturated polyalkylene glycol ether (III) represented by the following formula (3).

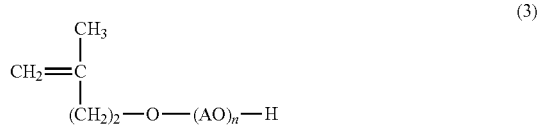

(3)

In the formula, AO is a C2-C18 oxyalkylene group; and n is an average addition number of moles of the oxyalkylene groups and is 2 to 15.

The addition reaction is carried out at a temperature of not lower than 80° C. and lower than 100° C., and an alkali catalyst is used in the addition reaction in an amount of 500 to 3,000 ppm based on the total amount of the unsaturated polyalkylene glycol ether (III) and the alkylene oxide.

The unsaturated polyalkylene glycol ether monomer (I)-containing composition of the present invention can be produced through the addition reaction carried out under the above conditions, and the polymer-containing composition for dispersants for cement of the present invention can be produced by polymerizing the unsaturated polyalkylene glycol ether monomer (I)-containing composition produced through the addition reaction under the above conditions, as a polymerization material.

In the production methods of the present invention, the alkylene oxide is added to the unsaturated polyalkylene glycol ether (III).

The unsaturated polyalkylene glycol ether (III) is a compound obtained by adding on average 2 to 15 mol of an alkylene oxide to 3-methyl-3-butene-1-ol (isoprenol), which is an unsaturated alcohol.

The unsaturated polyalkylene glycol ether (III) can be prepared by conventionally known reaction methods for adding an alkylene oxide to an unsaturated alcohol. Specifically, for example, the unsaturated alcohol and the alkylene oxide are mixed and stirred in the presence of an alkali catalyst in an inert gas atmosphere such as nitrogen atmosphere. In the case of an alkylene oxide having less carbon atoms, the addition reaction should be carried out under pressure in a pressure-resistance vessel such as an autoclave because such an alkylene oxide is gaseous at ambient temperature and pressure. The alkylene oxide is not particularly limited, as long as it is a C2-C18 alkylene oxide. Specific examples thereof include, but are not particularly limited to, ethylene oxide, propylene oxide, and butylene oxide. Any of these alkylene oxides may be used alone, or two or more of these may be used in combination.

Examples of the alkali catalyst include alkaline metals such as lithium, sodium, and potassium; alkaline metal hydrides such as lithium hydride, sodium hydride, and potassium hydride; organic lithium compounds such as n-butyl lithium; sodium amide; and metal hydroxides such as lithium hydroxide, sodium hydroxide, and potassium hydroxide. Any of these alkali catalysts may be used alone, or two or more of these may be used in combination. In terms of the handleability and economic efficiency, sodium hydride, sodium hydroxide, and potassium hydroxide are particularly preferred.

The temperature of the addition reaction to produce the unsaturated polyalkylene glycol ether (III) is not particularly limited, but is preferably 80° C. to 160° C., more preferably 100° C. to 140° C., and particularly preferably 100° C. to 120° C. in order to control the amount of polyalkylene glycol by-products produced as a result of addition polymerization of the alkylene oxide. The pressure during the addition reaction is not particularly limited and is appropriately controlled such that the addition reaction is allowed to smoothly proceed. Typically, the pressure is not higher than 1.0 MPa, and is preferably not higher than 0.9 MPa, and more preferably not higher than 0.8 MPa. The addition reaction time is appropriately determined based on the amounts of the unsaturated alcohol and the alkylene oxide and is not particularly limited. Typically, the addition reaction time is, for example, 0.5 to 24 hours, and is preferably 1 to 20 hours.

The methods of the present invention are characterized by the reaction step of adding the alkylene oxide to the unsaturated polyalkylene glycol ether (III). The temperature of the addition reaction is not lower than 80° C. and is lower than 100° C. If the temperature of the addition reaction is lower than 80° C., the preparation of the unsaturated polyalkylene glycol ether monomer (I)-containing composition takes a long time. Another disadvantage in this case is that it is difficult to control the amount of the isomer (B) in the resulting unsaturated polyalkylene glycol ether monomer (I)-containing composition and the parameter including α and β within the ranges which satisfy the above inequalities (3) and (4). If the temperature of the addition reaction is 100° C. or higher, it is difficult to control the amounts of the alkylene glycol (A) and the isomer (B) in the resulting unsaturated polyalkylene glycol ether monomer (I)-containing composition to as less as not more than 5% by mass based on 100% by mass of the unsaturated polyalkylene glycol ether monomer (I) or to control the parameter including α and β within the range that satisfies the above inequalities (3) and (4). As a result, the polymer-containing composition, which is the final product, has disadvantageously low cement dispersibility.

In the production methods of the present invention, the amount of the alkali catalyst used in the addition reaction is 500 to 3,000 ppm based on the total amount of the unsaturated polyalkylene glycol ether (III) and the alkylene oxide. If the amount of the alkali catalyst is less than 500 ppm, the preparation of the unsaturated polyalkylene glycol ether monomer (I)-containing composition takes a long time. Another disadvantage in this case is that it is difficult to control the amount of the isomer (B) in the unsaturated polyalkylene glycol ether monomer (I)-containing composition and the parameter including α and β within the above ranges which satisfy the above inequalities (3) and (4). If the amount of the alkali catalyst is more than 3,000 ppm, it is difficult to control the amounts of the alkylene glycol (A) and the isomer (B) in the unsaturated polyalkylene glycol ether monomer (I)-containing composition to as less as not more than 5% by mass based on 100% by mass of the unsaturated polyalkylene glycol ether monomer (I) or to control the parameter including α and β within the range that satisfies the inequalities (3) and (4). As a result, the polymer-containing composition, which is the final product, has disadvantageously low cement dispersibility.

Suitable examples of the alkali catalyst for the preparation of the unsaturated polyalkylene glycol ether monomer (I)-containing composition of the present invention include the same compounds as those used in the addition reaction for the preparation of the unsaturated polyalkylene glycol ether (III). The same conditions as those of the addition reaction for the preparation of the unsaturated polyalkylene glycol ether (III) can be used for the addition reaction for the preparation of the unsaturated polyalkylene glycol ether monomer (I)-containing composition of the present invention, except the addition reaction temperature and the amount of the alkali catalyst defined above.

The polymer-containing composition for dispersants for cement of the present invention may include a combination of two or more copolymers used in the present invention. Examples of such combinations include two or more copolymers having different ratios of the repeating unit derived from the unsaturated polyalkylene glycol ether monomer (I) and the repeating unit derived from the unsaturated carboxylic acid monomer (II); two or more copolymers having different ratios of the repeating unit derived from the unsaturated polyalkylene glycol ether monomer (I), the repeating unit derived from the unsaturated carboxylic acid monomer (II), and the repeating unit(s) derived from other copolymerizable monomer(s); two or more copolymers having different average addition numbers of moles of the oxyalkylene groups in the repeating units derived from the unsaturated polyalkylene glycol ether monomer (I); and a copolymer having the repeating unit derived from the unsaturated polyalkylene glycol ether monomer (I) and the repeating unit derived from the unsaturated carboxylic acid monomer (II) and a copolymer having the repeating unit derived from the unsaturated polyalkylene glycol ether monomer (I), the repeating unit derived from the unsaturated carboxylic acid monomer (II), and the repeating unit(s) derived from other copolymerizable monomer(s).

Examples of combinations of three copolymers used in the present invention include two copolymers having different ratios of the repeating unit derived from the unsaturated polyalkylene glycol ether monomer (I) and the repeating unit derived from the unsaturated carboxylic acid monomer (II), and a copolymer having the repeating unit derived from the unsaturated polyalkylene glycol ether monomer (I), the repeating unit derived from the unsaturated carboxylic acid monomer (II), and the repeating unit(s) derived from other copolymerizable monomer(s); a copolymer having the repeating unit derived from the unsaturated polyalkylene glycol ether monomer (I) and the repeating unit derived from the unsaturated carboxylic acid monomer (II), and two copolymers having different ratios of the repeating unit derived from the unsaturated polyalkylene glycol ether monomer (I), the repeating unit derived from the unsaturated carboxylic acid monomer (II), and the repeating unit(s) derived from other copolymerizable monomer(s).

In the case of such a combination of two or more copolymers as described above, an ester of an unsaturated monocarboxylic acid such as methyl(meth)acrylate and a C1-C30 alcohol and/or hydroxyl group-containing (meth)acrylate such as hydroxyethyl(meth)acrylate is/are preferably used as other copolymerizable monomer(s).

The polymer-containing composition for dispersants for cement of the present invention can be used for a cement composition (e.g. cement paste, mortar, concrete) that essentially includes cement and water and optionally includes an aggregate.

Specifically, suitable examples of the cement used in the cement composition include portland cement (ordinary, high early strength, super high early strength, moderate heat, sulfate-resistant, and their low alkalinity type), various types of mixed cement (blast furnace cement, silica cement, fly ash cement), white portland cement, alumina cement, ultra rapid hardening cement (1 clinker-rapid hardening, 2 clinker-rapid hardening cement, magnesium phosphate cement), cement for grouting, oil well cement, low heat cement, (low heat blast furnace cement, fly ash-mixed low heat blast furnace cement, high belite content cement), ultra high strength cement, cement solid material, and eco-cement (cement produced using at least one of municipal waste incineration ashes and wastewater sludge incineration ashes). The cement composition may further contain fine powders such as blast furnace slag, fly ashes, sinter ashes, clinker ashes, husk ashes, silica fume, silica powder, and limestone powder, and gypsum. Examples of the aggregate include pebbles, crushed stone, water granulated slag, and regenerated aggregates, and further include silica stone type, clay type, zircon type, high alumina type, silicon carbide type, graphite type, chromium type, chromium-magnesium type, and magnesia type refractory aggregates.

In the cement composition, the unit amount of water (per m$^3$) is preferably 100 to 185 kg/m$^3$, more preferably 120 to 175 kg/m$^3$, the amount of cement used is preferably 250 to 800 kg/m$^3$, more preferably 270 to 800 kg/m$^3$, and the ratio of water/cement (mass ratio) is preferably 0.1 to 0.7, more preferably 0.2 to 0.65. The polymer-containing composition can be used in the wide range of from lean mixtures to rich mixtures and is effective for any of high strength concrete with a large unit amount of cement and lean concrete with, a unit amount of cement of 300 kg/m$^3$ or less.

The amount of the polymer-containing composition for dispersants for cement of the present invention used in such a cement composition is preferably 0.01 to 10% by mass, more preferably 0.02 to 10% by mass, and further more preferably 0.05 to 5% by mass, as determined as the mass ratio of non-volatile matter content to the cement. Less than 0.01% by mass of the composition may only exhibit poor performance. The use of more than 10% by mass of the composition may be economically disadvantageous.

The polymer-containing composition for dispersants for cement of the present invention may be used together with another common dispersant for cement, or with two or more other dispersants for cement. In the case that other dispersant(s) for cement is/are used, the mass ratio of the polymer-containing composition for dispersants for cement of the present invention and the other dispersant(s) for cement cannot be definitely determined because the factors such as the type of the other dispersant(s) for cement and the differences in the amounts of materials used therein and test conditions should be considered. However, the mass ratio (% by mass) of the polymer-containing composition for dispersants for cement of the present/the other dispersant(s) for cement, as determined based on non-volatile matter content, is preferably (1 to 99)/(99 to 1), more preferably (5 to 99)/(99 to 5), and furthermore preferably (10 to 90)/(90 to 10).

Examples of other dispersants for cement usable with the polymer-containing composition for dispersants for cement of the present invention are listed below.

A variety of sulfonic acid dispersants having a sulfonic acid group in the molecule: polyalkylaryl sulfonate dispersants (e.g. naphthalene sulfonate-formaldehyde condensate); melamine formalin resin sulfonate dispersants (e.g. melamine sulfonate-formaldehyde condensate); aromatic aminosulfonate dispersants (e.g. amino aryl sulfonic acid-phenol-formaldehyde condensate); lignosulfonate dispersants (e.g. salts of lignosulfonic acid and modified lignosulfonic acid); and polystyrene sulfonate dispersants.

Other examples thereof include copolymers obtained by polymerization of polyalkylene glycol mono(meth)acrylic acid ester monomers, (meth)acrylic acid monomers, and monomers copolymerizable with these monomers, as described in of JP 59-18338 B and JP 07-223852 A; copolymers obtained by polymerization of polyethylene glycol monoallyl ether, maleic acid, and monomers copolymerizable with these monomers, and salts and esters thereof, as described in JP 58-38380 B; and various polycarboxylic acid dispersants each having a (poly)oxyalkylene group and a carboxyl group in the molecule such as hydrophilic graft polymers obtained by graft polymerization of polyether compounds with unsaturated carboxylic acid monomers, as described in JP 07-53645 A, JP 08-208769 A, and JP 08-208770 A.

The polymer-containing composition for dispersants for cement of the present invention may be optionally used together with appropriate agents for cement (additives for cement) selected from common agents. Examples thereof include water-soluble polymer substances, polymer emulsions, hardening retarders, high-early-strength agents/promoters, antifoaming agents, AE agents, water-proofing agents, rust preventives, crack-reducing agents, expanding agents, cement-wetting agents, thickeners, separation-reducing agents, flocculants, drying shrinkage-reducing agents, strength enhancers, self-leveling agents, colorants, and antifungal agents. Any of these agents for cement (additives for cement) may be used alone, or two or more of these may be used in combination.

Particularly preferred embodiments (1) to (7) of the polymer-containing composition for dispersants for cement of the present invention are given below.

(1) Combination including two components: <1> the polymer-containing composition for dispersants for cement of the present invention; and <2> an oxyalkylene antifoamer.

Examples of the oxyalkylene antifoamer include polyoxyalkylenes, polyoxyalkylene alkyl ethers, polyoxyalkylene acetylene ethers, and polyoxyalkylene alkyl amines. Preferred are polyoxyalkylene alkyl amines. The mass ratio of the oxyalkylene antifoamer <2> to the polymer-containing composition for dispersants for cement of the present invention <1> is preferably 0.01 to 20% by mass.

(2) Combination including three components: <1> the polymer-containing composition for dispersants for cement of the present invention; <2> an oxyalkylene antifoamer; and <3> an AE agent.

Examples of the oxyalkylene antifoamer include polyoxyalkylenes, polyoxyalkylene alkyl ethers, polyoxyalkylene acetylene ethers, and polyoxyalkylene alkyl amines. Preferred are polyoxyalkylene alkyl amines. The mass ratio of the oxyalkylene antifoamer <2> to the polymer-containing composition for dispersants for cement of the present invention <1> is preferably 0.01 to 20% by mass. The mass ratio of the AE agent <3> to the polymer-containing composition for dispersants for cement of the present invention <1> is preferably 0.01 to 2% by mass.

(3) Combination including three components: <1> the polymer-containing composition for dispersants for cement of the present invention; <2> a copolymer obtained by polymerization of a polyalkylene glycol mono(meth)acrylic acid ester monomer having a polyoxyalkylene chain of C2-C18 alkylene oxides (average addition number of moles: 2 to 300), a (meth)acrylic acid monomer, and a monomer copolymerizable with these monomers (for example, those described in JP 59-18338 B and JP 07-223852 A); and <3> an oxyalkylene antifoamer.

Examples of the oxyalkylene antifoamer include polyoxyalkylenes, polyoxyalkylene alkyl ethers, polyoxyalkylene acetylene ethers, and polyoxyalkylene alkyl amines. Preferred are polyoxyalkylene alkyl amines. The blending ratio of the polymer-containing composition for dispersants for cement of the present invention <1> and the copolymer <2> is preferably 5/95 to 95/5, and more preferably 10/90 to 90/10 as the mass ratio of polymer-containing composition for dispersants for cement of the present invention <1>/the copolymer <2>. The mass ratio of the oxyalkylene antifoamer <3> is preferably 0.01 to 20% by mass, relative to the total amount of the polymer-containing composition for dispersants for cement of the present invention <1> and the copolymer <2>.

(4) Combination including two components: <1> the polymer-containing composition for dispersants for cement of the present invention; and <2> a sulfonic acid dispersant having a sulfonic acid group in the molecule. Examples of the sulfonic acid dispersant include lignosulfonate salts, naphthalene sulfonate-formalin condensate, melamine sulfonate-formalin condensate, polystyrene sulfonic acid salts, and aminosulfonic acid dispersants such as aminoarylsulfonic acid-phenol-formaldehyde condensate. The blending ratio of the polymer-containing composition for dispersants for cement of the present invention <1> and the sulfonic acid dispersant <2> is preferably 5/95 to 95/5, and more preferably 10/90 to 90/10 as the mass ratio of the polymer-containing composition for dispersants for cement of the present invention <1>/the sulfonic acid dispersant <2>.

(5) Combination including two components: <1> the polymer-containing composition for dispersants for cement of the present invention; and <2> a material separation-reducing agent.

Examples of the material separation-reducing agent include a variety of thickeners such as nonionic cellulose ethers, and compounds having, as partial structures, a hydrophobic substituent including a C4-C30 hydrocarbon chain and a polyoxyalkylene chain of C2-C18 alkylene oxides (average addition number of moles: 2 to 300). The blending ratio of the polymer-containing composition for dispersants for cement of the present invention <1> and the material separation-reducing agent <2> is preferably 10/90 to 99.99/0.01, and more preferably 50/50 to 99.9/0.1 as the mass ratio of the polymer-containing composition for dispersants for cement of the present invention <1>/the material separation-reducing agent <2>. This combination of admixture for cement is suitable for high-fluidity concrete, self-compacting concrete, and a self-leveling agent.

(6) Combination including two components: <1> the polymer-containing composition for dispersants for cement of the present invention; and <2> a retarder.

Examples of the retarder include oxycarboxylic acids such as gluconic acid (salts) and citric acid (salts), sugars such as glucose, sugar alcohols such as sorbitol, and phosphonic acids such as aminotri(methylenephosphonic acid). Preferred are oxycarboxylic acids. The blending ratio of the polymer-containing composition for dispersants for cement of the present invention <1> and the retarder <2> is preferably 50/50 to 99.9/0.1, and more preferably 70/30 to 99/1 as the mass ratio of the polymer-containing composition for dispersants for cement of the present invention <1>/the retarder <2>.

(7) Combination including two components: <1> the polymer-containing composition for dispersants for cement of the present invention; and <2> a promoter.

Examples of the promoter include soluble calcium salts such as calcium chloride, calcium nitrite, and calcium nitrate; chlorides such as iron chloride and magnesium chloride; thiosulfuric acid salts; and formic acid and formic acid salts such as calcium formate. The blending ratio of the polymer-containing composition for dispersants for cement of the present invention <1> and the promoter <2> is preferably 10/90 to 99.9/0.1, and more preferably 20/80 to 99/1 as the mass ratio of the polymer-containing composition for dispersants for cement of the present invention <1>/the promoter <2>.

Effects of the Invention

The polymer-containing composition for dispersant for cement of the present invention is prepared by polymerizing the unsaturated polyalkylene glycol ether monomer (I)-containing composition that includes specific amounts of the polyalkylene glycol (A) and the isomer (B) of the unsaturated polyalkylene glycol ether monomer (I) in which the double bond is transferred. Namely, certain amounts of the polyalkylene glycol (A) and the isomer (B) are present in the polymer-containing composition. Therefore, when used as a dispersant for cement, the polymer-containing composition can increase the flowability of a cement composition such as mortar and concrete and stably maintain this high flowability for a certain period.

Since the unsaturated polyalkylene glycol ether monomer (I)-containing composition to be used as a polymerization material is produced by adding the alkylene oxide to the unsaturated polyalkylene glycol ether (III) at a certain addition reaction temperature using a certain amount of the alkali catalyst in the process of producing the polymer-containing composition for dispersants for cement of the present invention, the unsaturated polyalkylene glycol ether monomer (I)-containing composition can be stably produced with high productivity on an industrial scale. Since the production process includes the addition reaction of the alkylene oxide to the unsaturated polyalkylene glycol ether (III), the polymer-containing composition for dispersant for cement of the present invention can be easily produced without any special operations.

MODES FOR CARRYING OUT THE INVENTION

Figure 1:
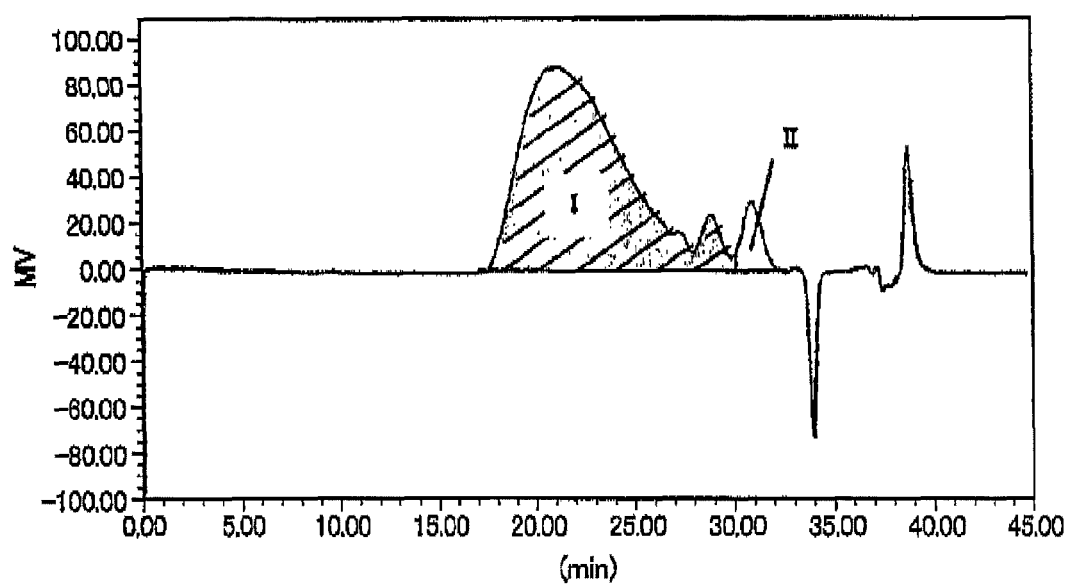
FIG. 1 is a gel permeation chromatography (GPC) chart for measurement of the copolymer content (polymer purity) of a polymer-containing composition, and is specifically a GPC chart obtained by using the polymer-containing composition (1) of the present invention prepared in Example 4, as a sample.
Figure 2:
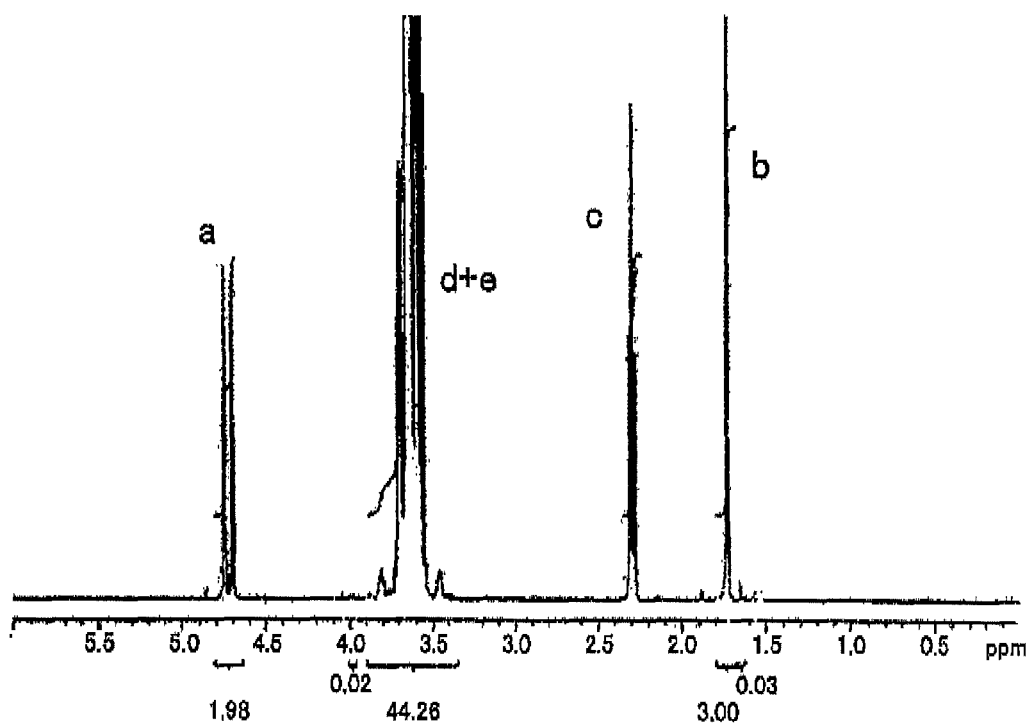
FIG. 2 is a NMR chart of the reaction product (1) prepared in Preparation 1.
Figure 3:
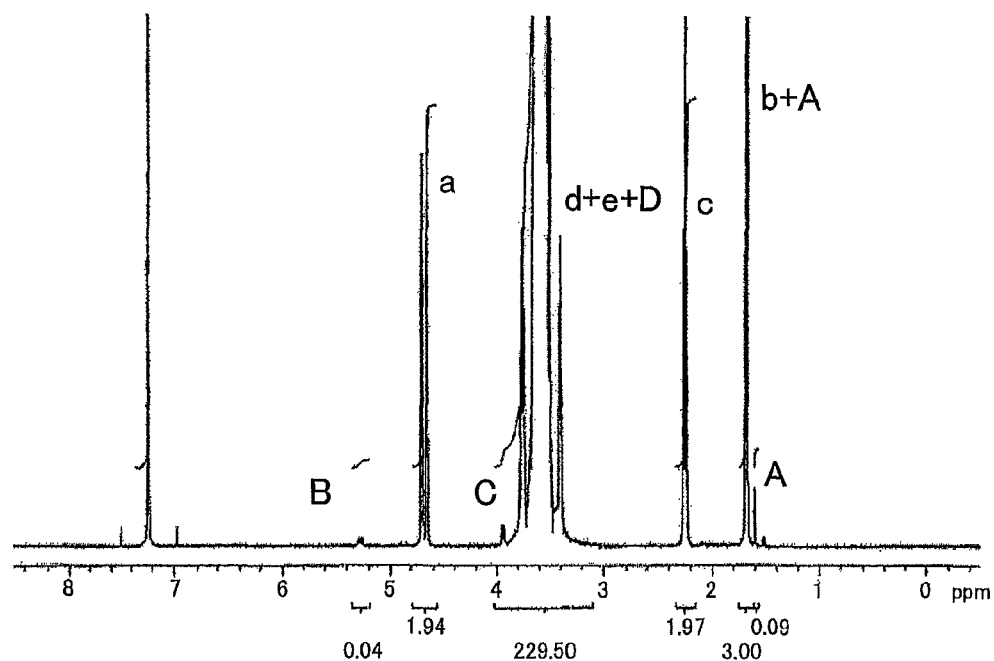
FIG. 3 is a NMR chart of the reaction product (1-1) prepared in Example 1.
Figure 4:
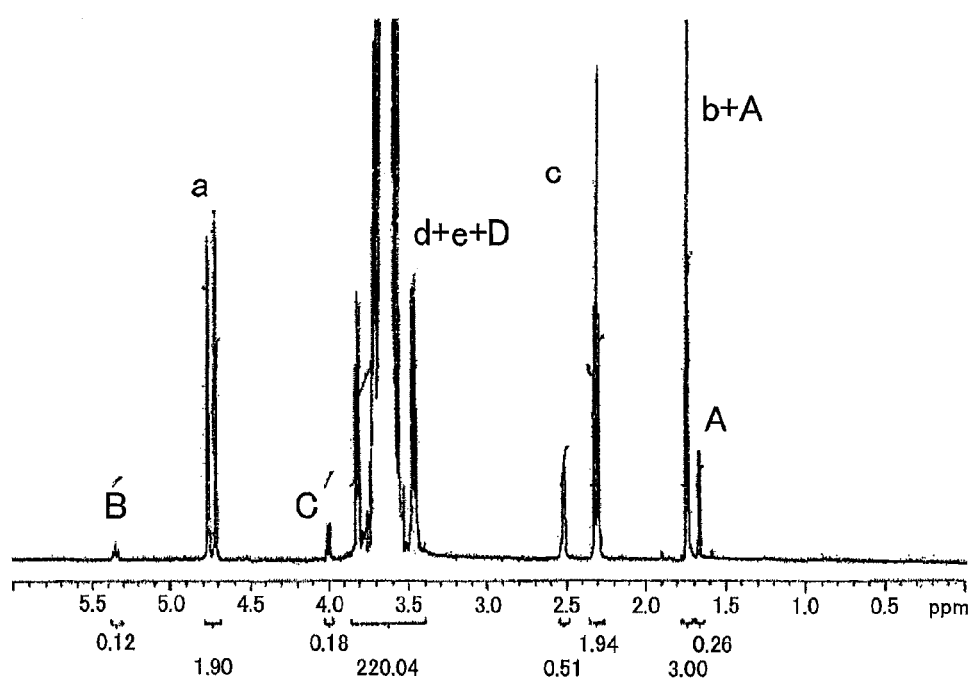
FIG. 4 is a NMR chart of the comparative reaction product (1) prepared in Comparative Example 1.
Figure 5:
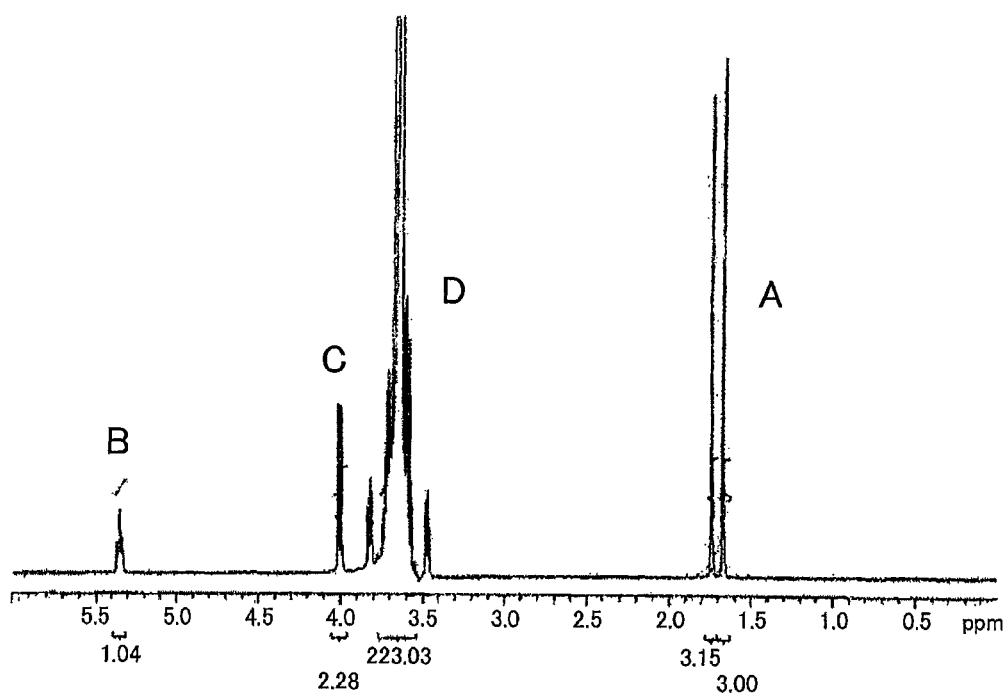
FIG. 5 is a NMR chart of the comparative reaction product (2) prepared in Comparative Example 2.

The following examples are set forth to illustrate the present invention in more detail and are not intended to limit the present invention. The present invention can be appropriately altered and all such alterations are also included in the technical scope of the present invention. All "%" and "ppm" units used below are by mass unless otherwise specified.

First, how to measure the amounts of polyethylene glycol corresponding to the polyalkylene glycol (A) and a compound represented by the following formula (5), which corresponds to the isomer (B), in the unsaturated polyalkylene glycol ether monomer (I)-containing composition is described below.

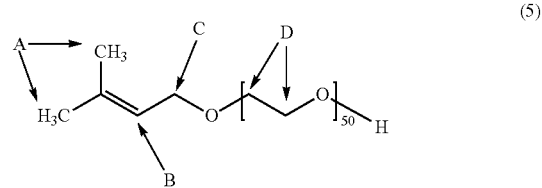
(5)

The compound represented by the above formula (5) corresponds to an isomer compound of an ethylene oxide adduct (average 50 mol) of 3-methyl-3-butene-1-ol (isoprenol) represented by the following formula (6) in which the double bond is transferred.

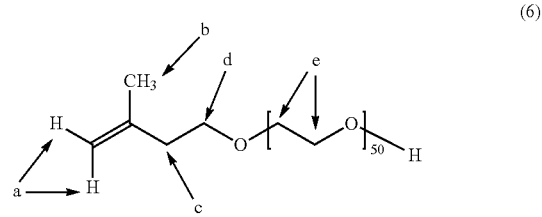
(6)

<Measurement of Polyethylene Glycol Amount>

The amount of the polyethylene glycol in each monomer-containing composition was measured by gel permeation chromatography (GPC) under the following conditions.

Column: GF-1G 7B (guard column) produced by Showa Denko K. K. and GF-310HQ produced by Showa Denko K. K.

Eluent: Water

Flow rate: 1 ml/minute

Sample amount: 100 µL of 5.0% eluent solution of each monomer-containing composition Column temperature: 40° C.

Standard substance: Polyethylene glycol, peak top molecular weight (Mp) 4,020

Detector: Refractive index detector L-7490 produced by Hitachi, Ltd.

<Measurement of Amount of Isomer Compound Represented by the Formula (5)>

Each monomer-containing composition was dissolved in heavy chloroform to give a 5% solution. The solution was measured by NMR at 400 MHz.

The absorptions at the positions of A, B, C, and D shown in the figures of the NMR charts obtained by the measurement correspond to the structures of A, B, C, and D in the isomer compound represented by the formula (5), respectively. The absorptions of a, b, c, d, and e shown in the figures correspond to the structures of a, b, c, d, and e in the structure of ethylene oxide adduct (average 50 mol) of 3-methyl-3-butene-1-ol (isoprenol) represented by the formula (6), respectively.

Next, how to measure the copolymer content (polymer purity) of each polymer-containing composition and the weight average molecular weight of each copolymer is described below.

<Measurement of Weight Average Molecular Weight of Copolymer>

The weight average molecular weight of the copolymer in each polymer-containing composition was measured by gel permeation chromatography (GPC) under the following conditions.

Column: TSK guard column SWXL, TSKgel G4000SWXL, G3000SWXL, and G2000SWXL produced by TOSOH Corp.

Eluent: Eluent mixture prepared by dissolving sodium acetate trihydrate (115.6 g) in a solvent mixture of water (10,999 g) and acetonitrile (6,001 g) and controlling the pH to 6.0 with acetic acid Sample amount: 100 µL of 0.5% eluent solution of each polymer-containing composition Column temperature: 40° C.

Standard substance: Polyethylene glycol, peak top molecular weights (Mp) 300,000, 219,300, 107,000, 50,000, 24,000, 11,840, 6,450, 4,020, and 1,470

Degree of calibration curve: Cubic

Detector: Refractive index detector 410 produced by Japanese Waters

Analytical software: Empower software produced by Japanese Waters

<Measurement of Copolymer Content (Polymer Purity) of Polymer-Containing Composition>

The polymer purity of each polymer-containing composition was determined based on the GPC chart of FIG. 1, by dividing the area of an area corresponding to all the polymers including the polyethylene glycol (I+II) by the area of an area corresponding to the copolymer in the polymer-containing composition (I).

<Preparation of Unsaturated Polyalkylene Glycol Ether>

(Preparation 1)

A SUS autoclave reactor equipped with a temperature gauge, a stirrer, a material-introducing tube, and a nitrogen-introducing tube was charged with 3-methyl-3-butene-1-ol (1,000 g) and sodium hydroxide (3.0 g, alkali catalyst) and then purged with nitrogen while the mixture was stirred. Then, the reactor was heated to 120° C. in the nitrogen atmosphere. Ethylene oxide (5,050 g) was introduced to the reactor over 8.5 hours at a safety pressure while the temperature was maintained at 120° C. After a 1-hour maturing period, the reaction was completed. The resulting reaction product included an ethylene oxide adduct (average 10 mol) of 3-methyl-3-butene-1-ol, which is referred to as an unsaturated polyalkylene glycol (1); polyethylene glycol; and an isomer of the unsaturated polyalkylene glycol (1) in which the double bond is transferred. This reaction product is referred to as a reaction product (1).

(Preparation 2)

A SUS autoclave reactor equipped with a temperature gauge, a stirrer, a material-introducing tube, and a nitrogen-introducing tube was charged with 3-methyl-2-butene-1-ol (1,000 g) and sodium hydroxide (3.0 g, alkali catalyst) and then purged with nitrogen while the mixture was stirred. Then, the reactor was heated to 120° C. in the nitrogen atmosphere. Ethylene oxide (5,050 g) was introduced to the reactor over 8.5 hours at a safety pressure while the temperature was maintained at 120° C. After a 1-hour maturing period, the reaction was completed. The resulting reaction product included an ethylene oxide adduct (average 10 mol) of 3-methyl-2-butene-1-ol, which is referred to as an unsaturated polyalkylene glycol (2); polyethylene glycol; and polyethylene glycol. This reaction product is referred to as a reaction product (2).

<Preparation of Unsaturated Polyalkylene Glycol Ether Monomer-Containing Composition>

Example 1

A SUS autoclave reactor equipped with a temperature gauge, a stirrer, a material-introducing tube, and a nitrogen-introducing tube was charged with the reaction product (1) (210 g) prepared in Preparation 1 and a 49% sodium hydroxide aqueous solution (3.52 g, alkali catalyst), and then heated to 95° C. Next, a pipe with a glass trap was connected to the upper part of the reactor and the pressure in the reactor was reduced to $5.32 \times 10^3$ Pa (40 Torr) using a vacuum pump while the mixture was stirred. After 2.5-hour dehydration, the reactor was purged with nitrogen and heated to 95° C. in the nitrogen atmosphere. Ethylene oxide (712.5 g) was introduced to the reactor over 7.7 hours at a safety pressure while the temperature was maintained at 95° C. After a 1-hour maturing period, the reaction was completed. The resulting reaction product included an ethylene oxide adduct (average 50 mol) of 3-methyl-3-butene-1-ol, which is referred to as an unsaturated polyalkylene glycol ether monomer (I-1); polyethylene glycol; and an isomer of the unsaturated polyalkylene glycol ether monomer (I-1) in which the double bond is transferred. This reaction product is referred to as a reaction product (I-1). The analytical results of the reaction product (I-1) are shown in Table 1.

Example 2

A SUS autoclave reactor equipped with a temperature gauge, a stirrer, a material-introducing tube, and a nitrogen-introducing tube was charged with the reaction product (1)

(191 g) prepared in Preparation 1 and potassium hydroxide granules (2.58 g, purity 85%, alkali catalyst), and then heated to 120° C. Next, a pipe with a glass trap was connected to the upper part of the reactor and the pressure in the reactor was reduced to 6.67×10³ Pa (50 Torr) using a vacuum pump while the mixture was stirred. After 1-hour dehydration, the reactor was purged with nitrogen and heated to 80° C. in the nitrogen atmosphere. Ethylene oxide (639.9 g) was introduced to the reactor over 7.3 hours at a safety pressure while the temperature was maintained at 80° C. After a 1-hour maturing period, the reaction was completed. The resulting reaction product included an ethylene oxide adduct (average 50 mol) of 3-methyl-3-butene-1-ol, which is referred to as an unsaturated polyalkylene glycol ether monomer (I-2); polyethylene glycol; and an isomer of the unsaturated polyalkylene glycol ether monomer (I-2) in which the double bond is transferred. This reaction product is referred to as a reaction product (I-2). The analytical results of the reaction product (I-2) are shown in Table 1.

Example 3

A SUS autoclave reactor equipped with a temperature gauge, a stirrer, a material-introducing tube, and a nitrogen-introducing tube was charged with the reaction product (1) (1,039 g) prepared in Preparation 1 and a 49% sodium hydroxide aqueous solution (4.1 g, alkali catalyst), and then heated to 100° C. Next, a pipe with a glass trap was connected to the upper part of the reactor and the pressure in the reactor was reduced to 5.32×10³ Pa (40 Torr) using a vacuum pump while the mixture was stirred. After 1-hour dehydration, the reactor was purged with nitrogen and the temperature was controlled to 95° C. in the nitrogen atmosphere. Ethylene oxide (3,386 g) was introduced to the reactor over 20 hours at a safety pressure while the temperature was maintained at 95° C. After a 1-hour maturing period, the reaction was completed. The resulting reaction product included an ethylene oxide adduct (average 50 mol) of 3-methyl-3-butene-1-ol, which is referred to as an unsaturated polyalkylene glycol ether monomer (I-3); polyethylene glycol; and an isomer of the unsaturated polyalkylene glycol ether monomer (I-3) in which the double bond is transferred. This reaction product is referred to as a reaction product (I-3). The analytical results of the reaction product (I-3) are shown in Table 1.

Comparative Example 1

A SUS autoclave reactor equipped with a temperature gauge, a stirrer, a material-introducing tube, and a nitrogen-introducing tube was charged with the reaction product (1) (143.5 g) prepared in Preparation 1 and a 48% sodium hydroxide aqueous solution (0.5 g, alkali catalyst), and then heated to 105° C. Next, a pipe with a glass trap was connected to the upper part of the reactor and the pressure in the reactor was reduced to 5.32×10³ Pa (40 Torr) using a vacuum pump while the mixture was stirred. After 1-hour dehydration, the reactor was purged with nitrogen and heated to 120° C. in the nitrogen atmosphere. Ethylene oxide (475.3 g) was introduced to the reactor over 7.5 hours at a safety pressure while the temperature was maintained at 120° C. After a 1-hour maturing period, the reaction was completed. The resulting reaction product included an ethylene oxide adduct (average 50 mol) of 3-methyl-3-butene-1-ol, which is referred to as an unsaturated polyalkylene glycol ether monomer (I-4); polyethylene glycol; and an isomer of the unsaturated polyalkylene glycol ether monomer (I-4) in which the double bond is transferred. This reaction product is referred to as a comparative reaction product (1). The analytical results of the comparative reaction product (1) are shown in Table 1.

Comparative Example 2

A SUS autoclave reactor equipped with a temperature gauge, a stirrer, a material-introducing tube, and a nitrogen-introducing tube was charged with the reaction product (2) (143.5 g) prepared in Preparation 2 and a 48% sodium hydroxide aqueous solution (0.5 g, alkali catalyst), and then heated to 105° C. Next, a pipe with a glass trap was connected to the upper part of the reactor and the pressure in the reactor was reduced to 5.32×10³ Pa (40 Torr) using a vacuum pump while the mixture was stirred. After 1-hour dehydration, the reactor was purged with nitrogen and heated to 120° C. in the nitrogen atmosphere. Ethylene oxide (475.3 g) was introduced to the reactor over 7.5 hours at a safety pressure while the temperature was maintained at 120° C. After a 1-hour maturing period, the reaction was completed. The resulting reaction product included an ethylene oxide adduct (average 50 mol) of 3-methyl-2-butene-1-ol, which is referred to as an unsaturated polyalkylene glycol ether monomer; and polyethylene glycol. This reaction product is referred to as a comparative reaction product (2). The analytical results of the comparative reaction product (2) are shown in Table 1.

The obtained unsaturated polyalkylene glycol ether monomer, that is, the ethylene oxide adduct (average 50 mol) of 3-methyl-2-butene-1-ol corresponds to the isomers that were present in small amounts in the reaction products (I-1) to (I-3) prepared in Examples 1 to 3.

TABLE 1

| | | Ethylene oxide addition temperature (° C.) | Amount of alkali catalyst (ppm) | Amount of polyethylene glycol (%) | Amount of isomer (%) | Parameter ($\alpha + 0.75\,\beta$) |
|---|---|---|---|---|---|---|
| Example 1 | Reaction product (I-1) | 95 | 2000 | 3.8 | 3.0 | 6.1 |
| Example 2 | Reaction product (I-2) | 80 | 2000 | 4.7 | 2.8 | 6.8 |
| Example 3 | Reaction product (I-3) | 95 | 500 | 4.1 | 1.3 | 5.1 |
| Comparative Example 1 | Comparative reaction product (1) | 120 | 500 | 6.1 | 7.3 | 11.6 |
| Comparative Example 2 | Comparative reaction product (2) | 120 | 500 | 6.0 | 94.0 | 76.5 |

<Preparation of Polymer-Containing Composition>

Example 4

A 500-ml glass reactor equipped with a temperature gauge, a stirrer, a nitrogen-introducing tube, and a cooling tube was charged with ion exchange water (97.3 g), the reaction product (I-1) (187.5 g) prepared in Example 1, and acrylic acid (1.35 g). The liquid mixture was stirred while nitrogen was blown into the mixture at 500 ml/minute. After the reactor was heated to 60° C., the mixture was stirred for 1 hour. The reactor was sufficiently purged with nitrogen and then charged with a 2% hydrogen peroxide aqueous solution (14.7 g). The flow rate of nitrogen was reduced to 50 ml/minute, and a 75.7% acrylic acid aqueous solution (31.7 g) was added dropwise over 3 hours. An aqueous solution obtained by dissolving L-ascorbic acid (0.38 g) and 3-mercaptopropionic acid (0.97 g) in water (46.2 g) was added dropwise over 3.5 hours at the same time as the addition of acrylic acid. Thereafter, the temperature was maintained at 60° C. for another 1 hour. Thus, the polymerization reaction was completed. The polymerization product was cooled to a temperature of not higher than 50° C. and neutralized to a pH of 6.5 with a 30% sodium hydroxide aqueous solution. As a result, a polymer-containing composition (1) of the present invention was obtained as a copolymer aqueous solution containing a polycarboxylic acid copolymer (1) having a weight average molecular weight of 32,000 at a polymer purity of 92.9%. Table 2 shows the monomers and amounts thereof used for the preparation of the polymer-containing composition and the copolymer content (polymer purity) of the polymer-containing composition.

Example 5

A reactor equipped with a temperature gauge, a stirrer, a nitrogen-introducing tube, and a cooling tube was charged with ion exchange water (109.1 g), the reaction product (1-2) (191.6 g) prepared in Example 2, and acrylic acid (0.35 g), and heated to 60° C. To the reactor, a 6.3% hydrogen peroxide aqueous solution (4.8 g) was added, and then a 62% acrylic acid aqueous solution (41.4 g) was added dropwise over 3 hours. An aqueous solution obtained by dissolving L-ascorbic acid (0.39 g) and 3-mercaptopropionic acid (0.85 g) in water (26.9 g) was added dropwise over 3.5 hours at the same time. Thereafter, the temperature was maintained at 60° C. for another 1 hour. Thus, the polymerization reaction was completed. The polymerization product was cooled to a temperature of not higher than 50° C. and neutralized to a pH of 6.5 with a 30% sodium hydroxide aqueous solution. As a result, a polymer-containing composition (2) of the present invention was obtained as a copolymer aqueous solution containing a polycarboxylic acid copolymer (2) having a weight average molecular weight of 30,000 at a polymer purity of 91.5%. Table 2 shows the monomers and amounts thereof used for the preparation of the polymer-containing composition and the copolymer content (polymer purity) of the polymer-containing composition.

Example 6

A reactor equipped with a temperature gauge, a stirrer, a nitrogen-introducing tube, and a cooling tube was charged with ion exchange water (76.9 g), the reaction product (1-3) (149.3 g) prepared in Example 3, acrylic acid (0.27 g), and acetic acid (0.72 g), and heated to 60° C. To the reactor, a 2.0% hydrogen peroxide aqueous solution (11.9 g) was added, and then a 80% acrylic acid aqueous solution (24.9 g) was added dropwise over 3 hours. An aqueous solution obtained by dissolving L-ascorbic acid (0.3 g) and 3-mercaptopropionic acid (1.1 g) in water (35.8 g) was added dropwise over 3.5 hours at the same time. Thereafter, the temperature was maintained at 60° C. for another 1 hour. Thus, the polymerization reaction was completed. The polymerization product was cooled to a temperature of not higher than 50° C. and neutralized to a pH of 6.5 with a 30% sodium hydroxide aqueous solution. As a result, a polymer-containing composition (3) of the present invention was obtained as a copolymer aqueous solution containing a polycarboxylic acid copolymer (3) having a weight average molecular weight of 35,000 at a polymer purity of 93.4%. Table 2 shows the monomers and amounts thereof used for the preparation of the polymer-containing composition and the copolymer content (polymer purity) of the polymer-containing composition.

Comparative Example 3

A reactor equipped with a temperature gauge, a stirrer, a nitrogen-introducing tube, and a cooling tube was charged with ion exchange water (76.9 g), the comparative reaction product (1) (149.3 g) prepared in Comparative Example 1, and acrylic acid (0.27 g), and heated to 60° C. To the reactor, a 2.0% hydrogen peroxide aqueous solution (11.9 g) was added, and then a 80% acrylic acid aqueous solution (24.9 g) was added dropwise over 3 hours. An aqueous solution obtained by dissolving L-ascorbic acid (0.3 g) and 3-mercaptopropionic acid (1.1 g) in water (35.8 g) was added dropwise over 3.5 hours at the same time. Thereafter, the temperature was maintained at 60° C. for another 1 hour. Thus, the polymerization reaction was completed. The polymerization product was cooled to a temperature of not higher than 50° C. and neutralized to a pH of 6.5 with a 30% sodium hydroxide aqueous solution. As a result, a comparative polymer-containing composition (1) was obtained as a copolymer aqueous solution containing a polycarboxylic acid copolymer having a weight average molecular weight of 31,000 at a polymer purity of 88.7%. Table 2 shows the monomers and amounts thereof used for the preparation of the polymer-containing composition and the copolymer content (polymer purity) of the polymer-containing composition.

Comparative Example 4

A reactor equipped with a temperature gauge, a stirrer, a nitrogen-introducing tube, and a cooling tube was charged with ion exchange water (76.9 g), the comparative reaction product (2) (149.3 g) prepared in Comparative Example 2, and acrylic acid (0.27 g), and heated to 60° C. To the reactor, a 2.0% hydrogen peroxide aqueous solution (11.9 g) was added, and then an 80% acrylic acid aqueous solution (24.9 g) was added dropwise over 3 hours at the same time. An aqueous solution obtained by dissolving L-ascorbic acid (0.3 g) and 3-mercaptopropionic acid (1.1 g) in water (35.8 g) was added dropwise over 3.5 hours at the same time. Thereafter, the temperature was maintained at 60° C. for another 1 hour. Thus, the polymerization reaction was completed. The polymerization product was cooled to a temperature of not higher than 50° C. and neutralized to a pH of 6.5 with a 30% sodium hydroxide aqueous solution. As a result, a comparative polymer-containing composition (2) was obtained as a copolymer aqueous solution containing a polycarboxylic acid copolymer having a weight average molecular weight of 7,700 at a polymer purity of 24.3%. Table 2 shows the monomers and amounts thereof used for the preparation of the polymer-containing composition and the copolymer content (polymer purity) of the polymer-containing composition.

The unsaturated polyalkylene glycol ether monomer in the comparative reaction product (2) used in the polymerization, that is, the ethylene oxide adduct (average 50 mol) of 3-methyl-2-butene-1-ol corresponds to the isomers (B) of the unsaturated polyalkylene glycol ether monomers (I-1) to (I-3) in the reaction products (I-1) to (I-3) used in Examples 4 to 6, that is, the isomers (B) of the ethylene oxide adducts (average 50 mol) of 3-methyl-3-butene-1-ol in which the double bond is transferred. The results clearly demonstrate that the polymerizability of this monomer is only approximately ¼ of the polymerizability of the unsaturated polyalkylene glycol ether monomers (I-1) to (I-3).

Examples 7 to 10, Comparative Examples 5 and 6

Polymer-containing compositions (4) to (7) of the present invention and comparative polymer-containing compositions (3) and (4) were prepared by the production methods in Examples 4 to 6 and Comparative Examples 3 and 4 and common polymerization methods.

It should be noted that the hydroxyethyl acrylate was mixed with an acrylic acid aqueous solution, and the resulting solution was added dropwise over 3.5 hours. Table 2 shows the monomers and amounts thereof used for the preparation of the polymer-containing compositions and the copolymer content (polymer purities) of the polymer-containing compositions.

Each polymer-containing composition for the performance evaluation tests was measured for non-volatile matter content, and a dispersant aqueous solution for cement was prepared using each composition in an amount determined based on the non-volatile matter content. The measurement of the non-volatile matter content was performed by sampling approximately 0.5 g of a polymer-containing composition in an aluminum cup; adding approximately 1 g of ion exchange water thereto; homogenously dispersing the composition therein; and drying the mixture in nitrogen atmosphere at 130° C. for 1 hour, and the non-volatile matter content was determined based on the difference in the mass before and after the drying.

The dispersion solutions for cement were prepared by sampling, in an aluminum cup, each polymer-containing composition in an amount that corresponds to 0.1% by mass of the cement in the mortar samples as determined based on non-volatile matter content; adding, to these samples, a 100-fold diluted solution of an antifoamer MA404 (produced by Pozzolith Bussan Co., Ltd.) in an amount of 10% by mass of the non-volatile matter content of each polymer-containing composition; and further adding ion exchange water, thereby providing solutions (220 g in total).

The mortar samples for the performance evaluation tests were prepared by adding, to each dispersant aqueous solution for cement (220 g), ordinary portland cement (produced by Taiheiyo Cement Corp., 550 g), and ISO standard sand (produced by Japan Cement Association, 1,350 g), and were evaluated for flow value and air content as follows.

TABLE 2

| | | Ratio of amounts of monomers used in polymerization (%) | Polymer purity (%) | Weight average molecules weight |
|---|---|---|---|---|
| Example 4 | Polymer composition (1) of the present invention | Reaction product (I-1)/ sodium acrylate = 85/15 | 92.9 | 32,000 |
| Example 5 | Polymer composition (2) of the present invention | Reaction product (I-2)/ sodium acrylate = 85/15 | 91.5 | 30,000 |
| Example 6 | Polymer composition (3) of the present invention | Reaction product (I-3)/ sodium acrylate = 85/15 | 93.4 | 35,000 |
| Example 7 | Polymer composition (4) of the present invention | Reaction product (I-2)/ sodium acrylate = 91/9 | 79.2 | 35,000 |
| Example 8 | Polymer composition (5) of the present invention | Reaction product (I-2)/ sodium acrylate = 95/5 | 86.2 | 36,000 |
| Example 9 | Polymer composition (6) of the present invention | Reaction product (I-2)/sodium acrylate/ hydroxyethyl acrylate = 82/8/10 | 91.2 | 32,000 |
| Example 10 | Polymer composition (7) of the present invention | Reaction product (I-2)/sodium acrylate/ hydroxyethyl acrylate = 88/4/8 | 84 | 49,000 |
| Comparative Example 3 | Comparative polymer composition (1) | Comparative reaction product (1)/ sodium acrylate = 85/15 | 88.7 | 31,000 |
| Comparative Example 4 | Comparative polymer composition (2) | Comparative reaction product (2)/ sodium acrylate = 85/15 | 24.3 | 7,700 |
| Comparative Example 5 | Comparative polymer composition (3) | Comparative reaction product (1)/ sodium acrylate = 91/9 | 77.5 | 34,000 |
| Comparative Example 6 | Comparative polymer composition (4) | Comparative reaction product (1)/ sodium acrylate/hydroxyethyl acrylate = 82/8/10 | 88.3 | 34,000 |

<Evaluation of Cement Dispersibility of Polymer-Containing Composition>

Example 11

Mortar samples for cement dispersibility evaluation were prepared from the polymer-containing compositions (1) to (4) and (6) of the present invention prepared in Examples 4 to 7 and 9 and from comparative polymer-containing compositions (1), (3), and (4) prepared in Comparative Examples 3, 5, and 6, and evaluated for flow value and air content as follows. The measured results are shown in Table 3.

(Measurement of Flow Value)

A mixture of the cement (550 g) and each dispersant aqueous solution for cement (220 g) was kneaded in a mixer (model: N-50 produced by HOBART K. K.) at a low speed for 30 seconds, and the ISO sand (1,350 g) was added to the mixer over 30 seconds. After kneading the mixture at a high speed for 30 seconds, the mixer was stopped and mortar attached to the vessel wall was rubbed off for 15 seconds. After 75 seconds, the mixture was kneaded at a high speed for 60 seconds. In this manner, the mortar samples were prepared.

Each mortar sample was filled to one half the height of a flowcone (JIS R 5201) on a table according to JIS R 5201, and pounded with a bar 15 times. Each mortar sample was filled up to the top edge of the flowcone and pounded with a bar 15 times. Subsequently, the flowcone filled with the mortar sample was carefully raised vertically, and the longer diameter (mm) and the shorter diameter (mm) of the mortar spreading on the table were measured. The average of the diameters was regarded as a mortar flow value (initial value). Each mortar sample was left standing, mixed with water, and then evaluated for mortar flow values (30 minute, 60 minute) again after 30 minutes and 60 minutes from the addition of water.

(Measurement of Air Content)

A portion (about 200 ml) of each mortar sample prepared as described above was filled in a 500 ml graduated cylinder, and pounded with a round bar having a diameter of 8 mm. Then, the cylinder was shaken to remove large bubbles. Another portion (about 200 ml) of the mortar sample was added and large bubbles were removed in the same manner. Thereafter, the volume and the mass were measured and the air content was calculated from the mass and the density of each material.

TABLE 3

| Polymer composition used to prepare mortar sample for performance evaluation test | Amount (%) of polymer composition relative to cement (based on non-volatile matter) | Flow value of mortar sample | | | Air content of mortar sample (Volume %) |
|---|---|---|---|---|---|
| | | Initial | 30 minutes | 60 minutes | |
| Polymer composition (1) of the present invention | 0.1 | 215 | 182 | 168 | 5.2 |
| Polymer composition (2) of the present invention | 0.1 | 212 | 189 | 168 | 4.4 |
| Polymer composition (3) of the present invention | 0.1 | 218 | 185 | 165 | 4.7 |
| Polymer composition (4) of the present invention | 0.1 | 225 | 231 | 220 | 2.8 |
| Polymer composition (6) of the present invention | 0.1 | 164 | 221 | 214 | 3.7 |
| Comparative polymer composition (1) | 0.1 | 201 | 171 | 155 | 4.3 |
| Comparative polymer composition (3) | 0.1 | 210 | 229 | 208 | 3.1 |
| Comparative polymer composition (4) | 0.11 | 150 | 196 | 200 | 3.1 |

Example 12

A mortar sample for cement dispersibility evaluation was prepared in the same manner as in Example 11, except that a mixture of polymer-containing compositions was prepared by mixing a plurality of polymer-containing compositions at a weight ratio shown in Table 4 as the polymer-containing composition. The mortar flow values and the air content were measured in the same manner. The results are shown in Table 4.

TABLE 4

| Polymer composition used to prepare mortar sample for performance evaluation test (weight ratio) | Amount (%) of polymer composition relative to cement (based on non-volatile matter) | Flow value of mortar sample | | | | Air content of mortar sample (Volume %) |
|---|---|---|---|---|---|---|
| | | Initial | 30 minutes | 60 minutes | 90 minutes | |
| Polymer composition of the present invention (2)/polymer composition (5) of the present invention = 1/1 | 0.15 | 200 | 218 | 206 | 170 | 2.6 |
| Polymer composition of the present invention (2)/polymer composition (6) of the present invention = 1/1 | 0.11 | 205 | 203 | 193 | 155 | 2.8 |
| Polymer composition (2) of the present invention/polymer composition (6) of the present invention/polymer composition (7) of the present invention = 1/1/1 | 0.14 | 197 | 203 | 210 | 197 | 3.1 |
| Comparative polymer composition (1)/Comparative polymer composition (4) = 1/1 | 0.115 | 181 | 175 | 162 | 132 | 3.5 |

The results of Examples and Comparative Examples demonstrate that a polymer-containing composition prepared by polymerizing an unsaturated polyalkylene glycol ether monomer (I)-containing composition that contains 1 to 5% by mass of a polyalkylene glycol and 1 to 5% by mass of an isomer of the unsaturated polyalkylene glycol ether monomer (I) in which the double bond is transferred, based on 100% by mass of the unsaturated polyalkylene glycol ether monomer (I) exhibits excellent cement dispersibility and can provide high flowability to a cement composition and stably maintain this high flowability for a certain period.

The invention claimed is:

1. A method of producing a polymer-containing composition for dispersants for cement, the composition comprising a polymer comprising a repeating unit derived from an unsaturated polyalkylene glycol ether monomer (I) and a repeating unit derived from an unsaturated carboxylic acid monomer (II), wherein the unsaturated polyalkylene glycol ether monomer (I) is represented by the following formula (1):

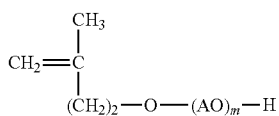
(1)

wherein AO is a C2-C18 oxyalkylene group; and m is an average addition number of moles of the oxyalkylene groups and is 40 to 250, the unsaturated carboxylic acid monomer (II) is represented by the following formula (2):

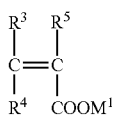
(2)

wherein $R^3$ and $R^4$, which are the same or different, each are a hydrogen atom, a methyl group, or —COOM$^2$ and are not both —COOM$^2$; $R^5$ is a hydrogen atom, a methyl group, or —CH$_2$COOM$^3$; $R^3$ and $R^4$, which are the same or different, each are a hydrogen atom or a methyl group when $R^5$ is —CH$_2$COOM$^3$; $M^1$, $M^2$, and $M^3$ each are a hydrogen atom, a monovalent metal, a divalent metal, ammonium, or an organic amine, the method comprising a step of polymerizing an unsaturated polyalkylene glycol ether monomer (I)-containing composition and the unsaturated carboxylic acid monomer (II), wherein the unsaturated polyalkylene glycol ether monomer (I)-containing composition comprises 1 to 5% by mass of a polyalkylene glycol (A) and 1 to 5% by mass of an isomer (B) of the unsaturated polyalkylene glycol ether monomer (I) in which the double bond is transferred, based on 100% by mass of the unsaturated polyalkylene glycol ether monomer (I).

2. The method of producing a polymer-containing composition for dispersants for cement according to claim 1,
wherein the polymer-containing composition for dispersants for cement is obtained by polymerizing an unsaturated polyalkylene glycol ether monomer (I)-containing composition that satisfies the following inequalities:

$$3 \leq \alpha + 0.75 \times \beta \leq 8 \quad (3)$$

and $$1 \leq \beta \leq 4 \quad (4)$$

wherein α is an amount of the polyalkylene glycol (A) and β is an amount of the isomer (B) based on 100% by mass of the unsaturated polyalkylene glycol ether monomer (I).

3. A method for producing a polymer-containing composition for dispersants for cement according to claim 1, the method comprising an addition reaction of an alkylene oxide to an unsaturated polyalkylene glycol ether (III) to thereby obtain the monomer (I), wherein the unsaturated polyalkylene glycol ether (III) is represented by the following formula (3):

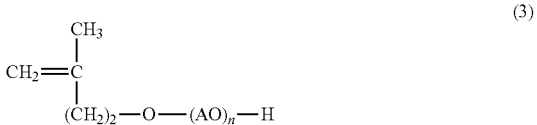
(3)

wherein AO is a C2-C18 oxyalkylene group; and n is an average addition number of moles of the oxyalkylene groups and is 2 to 15, the addition reaction is carried out at a temperature of not lower than 80° C. and lower than 100° C., and an alkali catalyst is used in the addition reaction in an amount of 500 to 3000 ppm based on the total amount of the unsaturated polyalkylene glycol ether (III) and the alkylene oxide.

4. An unsaturated polyalkylene glycol ether monomer (I)-containing composition comprising an unsaturated polyalkylene glycol ether monomer (I) represented by the following formula (1):

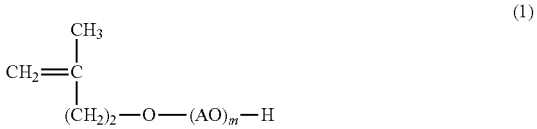
(1)

wherein AO is a C2-C18 oxyalkylene group; and m is an average addition number of moles of the oxyalkylene groups and is 40 to 250, and 1 to 5% by mass of a polyalkylene glycol (A) and 1 to 5% by mass of an isomer (B) of the unsaturated polyalkylene glycol ether monomer (I) in which the double bond is transferred, based on 100% by mass of the unsaturated polyalkylene glycol ether monomer (I).

5. The unsaturated polyalkylene glycol ether monomer (I)-containing composition according to claim 4,
wherein the unsaturated polyalkylene glycol ether monomer (I)-containing composition satisfies the following inequalities:

$$3 \leq \alpha + 0.75 \times \beta \leq 8 \quad (3)$$

and $$1 \leq \beta \leq 4 \quad (4)$$

wherein α is an amount of the polyalkylene glycol (A) and β is an amount of the isomer (B) based on 100% by mass of the unsaturated polyalkylene glycol ether monomer (I).

6. A method for producing an unsaturated polyalkylene glycol ether monomer (I)-containing composition according to claim 4, the method comprising an addition reaction of an alkylene oxide to an unsaturated polyalkylene glycol ether (III) to thereby obtain the monomer (I),
wherein the unsaturated polyalkylene glycol ether (III) is represented by the following formula (3):

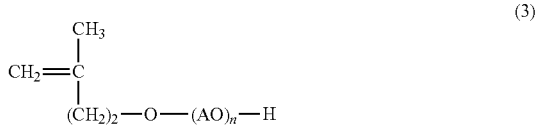

(3)

wherein AO is a C2-C18 oxyalkylene group; and n is an average addition number of moles of the oxyalkylene groups and is 2 to 15,
the addition reaction is carried out at a temperature of not lower than 80° C. and lower than 100° C., and
an alkali catalyst is used in the addition reaction in an amount of 500 to 3,000 ppm based on the total amount of the unsaturated polyalkylene glycol ether (III) and the alkylene oxide.

7. A method for producing a polymer-containing composition for dispersants for cement according to claim 2, the method comprising an addition reaction of an alkylene oxide to an unsaturated polyalkylene glycol ether (III) to thereby obtain the monomer (I),
wherein the unsaturated polyalkylene glycol ether (III) is represented by the following formula (3):

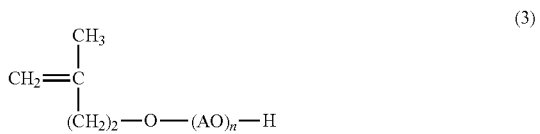

(3)

wherein AO is a C2-C18 oxyalkylene group; and n is an average addition number of moles of the oxyalkylene groups and is 2 to 15,
the addition reaction is carried out at a temperature of not lower than 80° C. and lower than 100° C., and
an alkali catalyst is used in the addition reaction in an amount of 500 to 3000 ppm based on the total amount of the unsaturated polyalkylene glycol ether (III) and the alkylene oxide.

8. A method for producing an unsaturated polyalkylene glycol ether monomer (I)-containing composition according to claim 5, the method comprising an addition reaction of an alkylene oxide to an unsaturated polyalkylene glycol ether (III) to thereby obtain the monomer (I),
wherein the unsaturated polyalkylene glycol ether (III) is represented by the following formula (3):

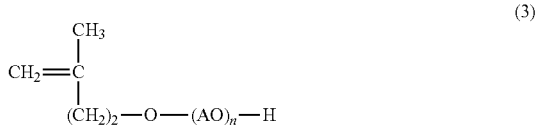

(3)

wherein AO is a C2-C18 oxyalkylene group; and n is an average addition number of moles of the oxyalkylene groups and is 2 to 15,
the addition reaction is carried out at a temperature of not lower than 80° C. and lower than 100° C., and
an alkali catalyst is used in the addition reaction in an amount of 500 to 3,000 ppm based on the total amount of the unsaturated polyalkylene glycol ether (III) and the alkylene oxide.

9. The method for producing a polymer-containing composition for dispersants for cement according to claim 3, wherein the alkali catalyst is sodium hydroxide, potassium hydroxide or both.

10. The method for producing an unsaturated polyalkylene glycol ether monomer (I)-containing composition according to claim 6, wherein the alkali catalyst is sodium hydroxide, potassium hydroxide or both.

11. The method of producing a polymer-containing composition for dispersants for cement according to claim 1,
wherein the isomer (B) of the unsaturated polyalkylene glycol ether monomer (I) in which the double bond is transferred is represented by the following formula (5):

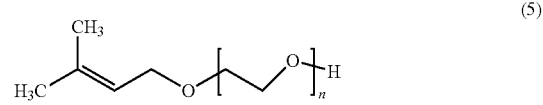

(5)

wherein n is 40 to 250.

12. The unsaturated polyalkylene glycol ether monomer (I)-containing composition according to claim 4,
wherein the isomer (B) of the unsaturated polyalkylene glycol ether monomer (I) in which the double bond is transferred is represented by the following formula (5):

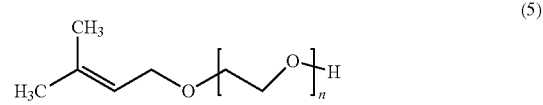

(5)

wherein n is 40 to 250.

13. The method of producing a polymer-containing composition for dispersants for cement according to claim 2,
wherein the lower limit of the parameter of the inequality (3) is 4.

14. The unsaturated polyalkylene glycol ether monomer (I)-containing composition according to claim 5,
wherein the lower limit of the parameter of the inequality (3) is 4.

15. The method of producing a polymer-containing composition for dispersants for cement according to claim 1,
wherein the unsaturated polyalkylene glycol ether monomer (1)-containing composition comprises 1 to 5% by mass of a polyalkylene glycol (A) and 1.3 to 5% by mass of an isomer (B) of the unsaturated polyalkylene glycol ether monomer (I) in which the double bond is transferred, based on 100% by mass of the unsaturated polyalkylene glycol ether monomer (I).

16. The unsaturated polyalkylene glycol ether monomer (I)-containing composition according to claim 4,
wherein the monomer (I)-containing composition further comprising 1 to 5% by mass of a polyalkylene glycol (A) and 1.3 to 5% by mass of an isomer (B) of the unsaturated polyalkylene glycol ether monomer (I) in which the double bond is transferred, based on 100% by mass of the unsaturated polyalkylene glycol ether monomer (I).

* * * * *